US009473676B2

(12) United States Patent
Hasegawa

(10) Patent No.: US 9,473,676 B2
(45) Date of Patent: Oct. 18, 2016

(54) IMAGE PROCESSING APPARATUS

(71) Applicant: Brother Kogyo Kabushiki Kaisha, Nagoya-shi, Aichi-ken (JP)

(72) Inventor: Tomohiko Hasegawa, Okazaki (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

(21) Appl. No.: 14/466,302

(22) Filed: Aug. 22, 2014

(65) Prior Publication Data

US 2015/0055153 A1    Feb. 26, 2015

(30) Foreign Application Priority Data

Aug. 23, 2013  (JP) .................. 2013-173280

(51) Int. Cl.
| | |
|---|---|
| H04N 1/405 | (2006.01) |
| H04N 1/60 | (2006.01) |
| H04N 1/409 | (2006.01) |

(52) U.S. Cl.
CPC .......... *H04N 1/6027* (2013.01); *H04N 1/4092* (2013.01); *H04N 2201/0094* (2013.01)

(58) Field of Classification Search
CPC ...... H04N 1/40062; H04N 1/58; H04N 1/46; H04N 1/62; H04N 9/73; H04N 1/6027; H04N 9/643; H04N 9/646; H04N 1/409; H04N 1/4092; H04N 1/60; H04N 1/628; G06T 2207/10024; G06T 7/408; G09G 2320/0666; G09G 5/026; G09G 2320/0606; G09G 5/06

USPC ......... 358/1.9, 2.1, 500, 504, 400, 406, 518, 358/3.01, 3.21, 3.23–3.26, 1.1, 1.13; 382/162–167, 275; 345/690, 593, 589
See application file for complete search history.

(56) References Cited

U.S. PATENT DOCUMENTS

| | | | |
|---|---|---|---|
| 7,324,701 B2 * | 1/2008 | Nakami | 382/262 |
| 2011/0033124 A1 * | 2/2011 | Kuno | 382/233 |
| 2012/0200733 A1 * | 8/2012 | Utsugi | 348/223.1 |
| 2014/0285511 A1 * | 9/2014 | Hoshino | 345/590 |

FOREIGN PATENT DOCUMENTS

| | | | |
|---|---|---|---|
| JP | 2005341417 A | * | 12/2005 |
| JP | 2008-252786 A | | 10/2008 |

* cited by examiner

*Primary Examiner* — Thomas D Lee
*Assistant Examiner* — Stephen M Brinich
(74) *Attorney, Agent, or Firm* — Banner & Witcoff, Ltd.

(57) ABSTRACT

An image processing apparatus includes: a processor; and memory storing computer readable instructions, when executed by the processor, causing the image processing apparatus to execute: acquiring target data representing a target image; calculating, for each of a plurality of target pixels forming the target data, a density relation value related to density of the target pixel; selecting a conversion color for an object pixel among the plurality of target pixels; converting pixel value of the object pixel to generate converted data such that, the higher the density represented by the density relation value of the object pixel, the closer the pixel value of a pixel of the converted data to a value indicative of the conversion color for the object pixel; and outputting the converted data.

10 Claims, 25 Drawing Sheets

FIG. 5
(FIRST EMBODIMENT)
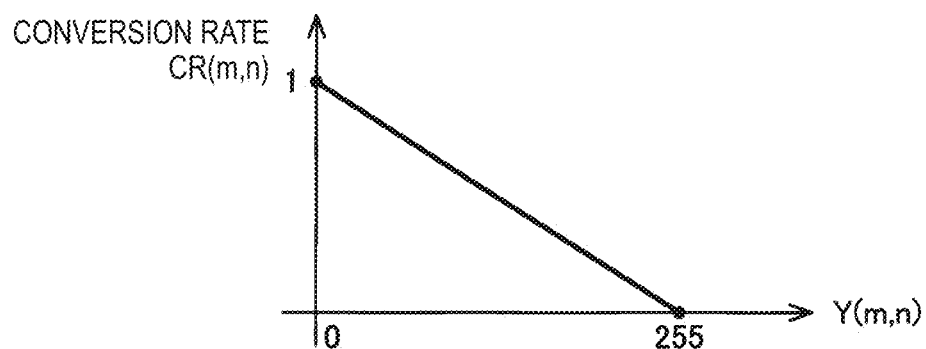
$$CR(m,n) = -\frac{1}{255} * Y(m,n) + 1$$
(SECOND EMBODIMENT)
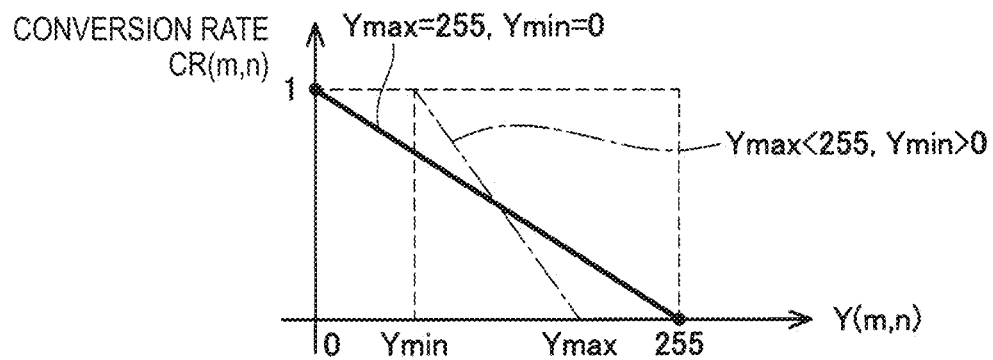
$$CR(m,n) = -\frac{1}{Ymax-Ymin} * Y(m,n) + \frac{Ymax}{Ymax-Ymin}$$

(FIRST EMBODIMENT)

(FIRST EMBODIMENT)

(THIRD EMBODIMENT)

FIG. 11
(THIRD EMBODIMENT)
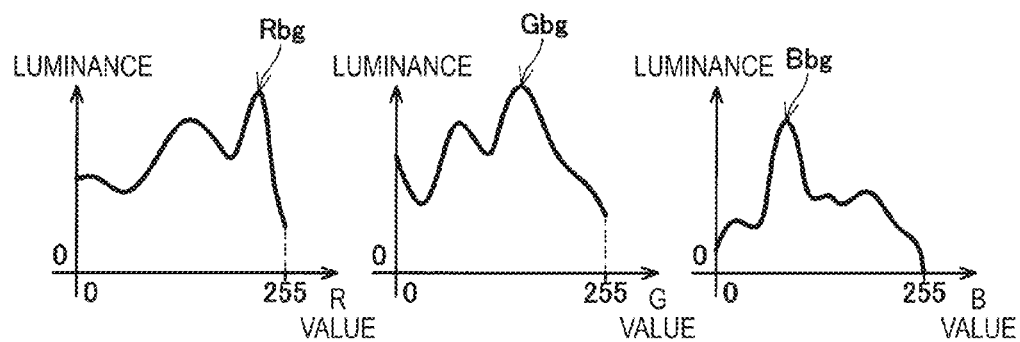
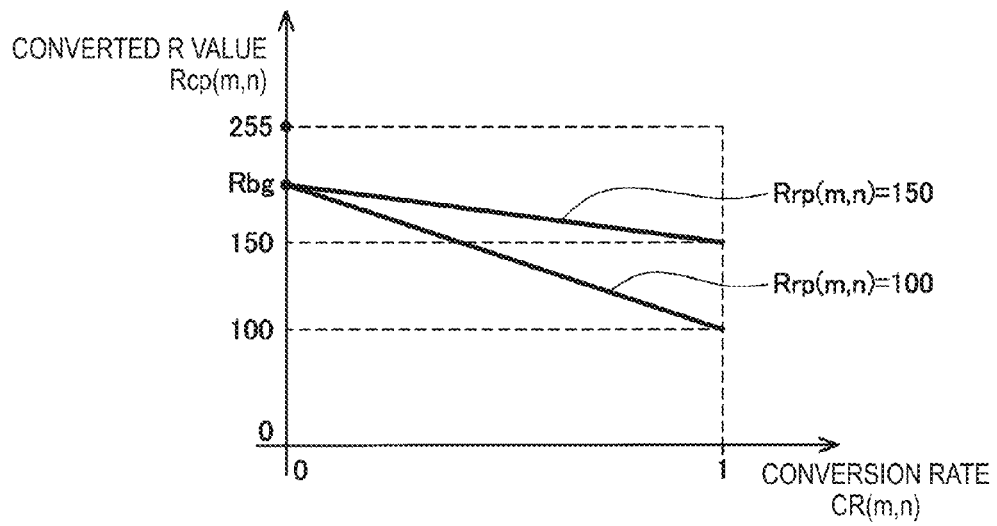
$RGBcp(m,n) = CR(m,n) * RGBrp(m,n) + (1-CR(m,n)) * RGBbg$
$$\begin{pmatrix} Rcp(m,n) = CR(m,n) * Rrp(m,n) + (1-CR(m,n)) * Rbg \\ Gcp(m,n) = CR(m,n) * Grp(m,n) + (1-CR(m,n)) * Gbg \\ Bcp(m,n) = CR(m,n) * Brp(m,n) + (1-CR(m,n)) * Bbg \end{pmatrix}$$

(FOURTH EMBODIMENT)

FIG. 13

TARGET DATA TD

| RGBtp(0,0) | RGBtp(1,0) PIXEL TP(1,0) | RGBtp(2,0) |
| RGBtp(0,1) | RGBtp(1,1) | RGBtp(2,1) |
| RGBtp(0,2) | RGBtp(1,2) | RGBtp(2,2) |

BINARY DATA BD

| 0 | 0 PIXEL BP(1,0) | 0 |
| 0 | 1 | 1 |
| 0 | 1 | 0 |

REFERENCE DATA RD

| RGBrp(0,0) | RGBrp(1,0) PIXEL RP(1,0) | RGBrp(2,0) |
| RGBrp(0,1) | RGBrp(1,1) | RGBrp(2,1) |
| RGBrp(0,2) | RGBrp(1,2) | RGBrp(2,2) |

CONVERTED DATA CD1

| RGBcp(0,0)<br>=RGBtp(0,0) | RGBcp(1,0)<br>=RGBtp(1,0) PIXEL CP(1,0) | RGBcp(2,0)<br>=RGBtp(2,0) |
| RGBcp(0,1)<br>=RGBtp(0,1) | RGBcp(1,1)<br>= CONVERTED<br>VALUE | RGBcp(2,1)<br>= CONVERTED<br>VALUE |
| RGBcp(0,2)<br>=RGBtp(0,2) | RGBcp(1,2)<br>= CONVERTED<br>VALUE | RGBcp(2,2)<br>=RGBtp(2,2) |

CONVERTED VALUE = CR(m,n) * RGBrp(m,n) +
(1 − CR(m,n)) * (255,255,255)

(FOURTH EMBODIMENT)

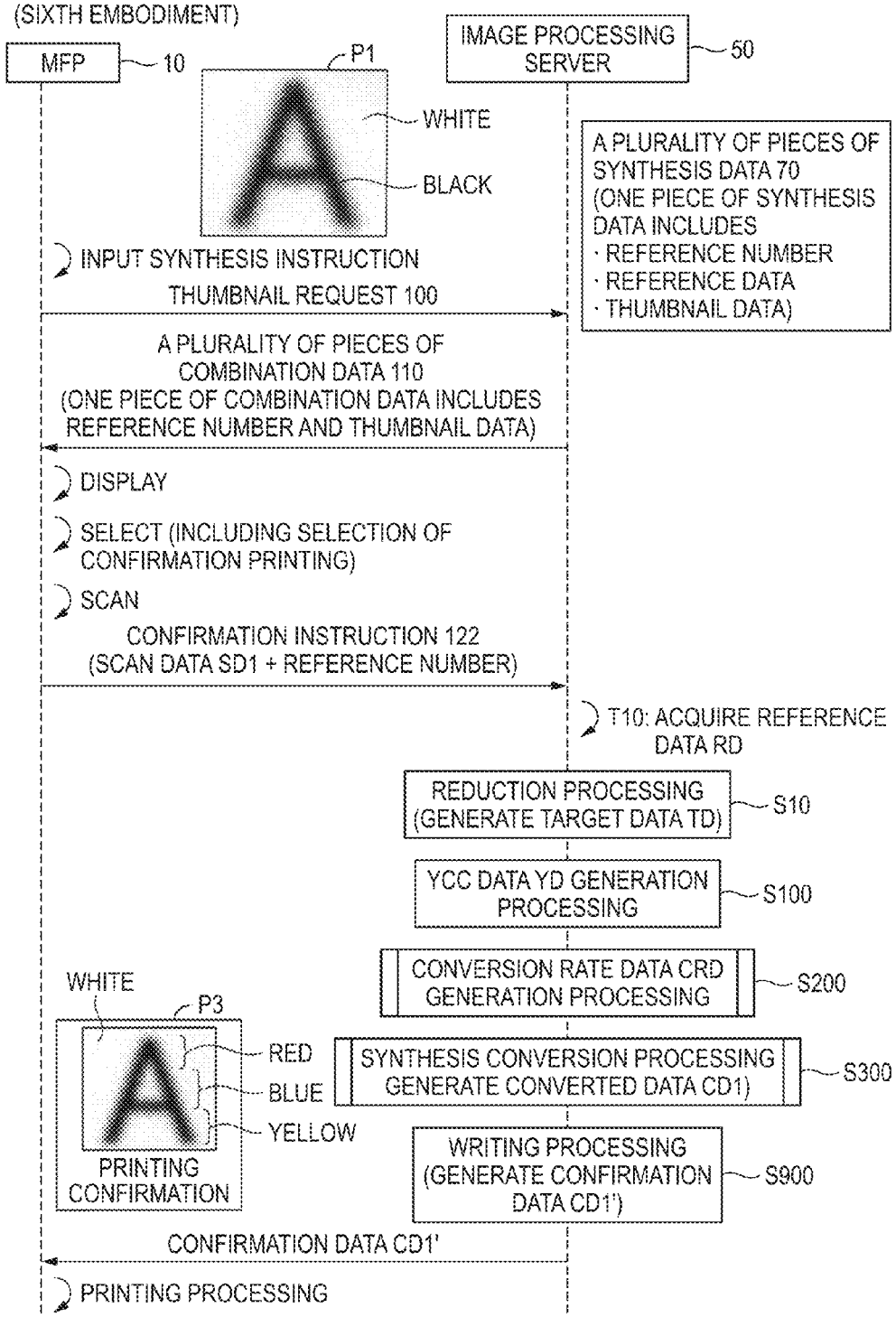

IMAGE PROCESSING APPARATUS

CROSS REFERENCE TO RELATED APPLICATION

This application is based upon and claims the benefit of priority of Japanese Patent Application No. 2013-173280 filed on Aug. 23, 2013, the contents of which are incorporated herein by reference in its entirety.

BACKGROUND

The present disclosure discloses an image processing apparatus which executes image processing on target data.

An image processing apparatus which superimposes sub information on main image information is known. The image processing apparatus modulates a first color difference lattice pattern by first sub information to superimpose the first color difference lattice pattern on the main image information. Next, the image processing apparatus modulates a second color difference lattice pattern by second sub information to further superimpose the second color difference lattice pattern on the main image information.

SUMMARY

The present disclosure discloses a technique which can provide a user with an appropriate converted image according to the gradation level of each region in a target image to be converted.

One aspect of the present disclosure provides the following arrangement.

An image processing apparatus comprising:
a processor; and
memory storing computer readable instructions, when executed by the processor, causing the image processing apparatus to execute:
acquiring target data representing a target image;
calculating, for each of a plurality of target pixels forming the target data, a density relation value related to density of the target pixel;
selecting a conversion color for an object pixel among the plurality of target pixels;
converting pixel value of the object pixel to generate converted data such that, the higher the density represented by the density relation value of the object pixel, the closer the pixel value of a pixel of the converted data to a value indicative of the conversion color for the object pixel; and
outputting the converted data.

A non-transitory computer readable recording medium storing a program for an image processing apparatus which causes a computer mounted in the image processing apparatus to execute:
acquiring target data representing a target image;
calculating, for each of a plurality of target pixels forming the target data, a density relation value related to density of the target pixel;
selecting a conversion color for an object pixel among the plurality of target pixels;
converting pixel value of the object pixel to generate converted data such that, the higher the density represented by the density relation value of the object pixel, the closer the pixel value of a pixel of the converted data to a value indicative of the conversion color for the object pixel; and
outputting the converted data.

BRIEF DESCRIPTION OF THE DRAWINGS

FIG. 5 is a graph showing the relationship between a luminance value and a conversion rate.

FIG. 11 is a graph showing the relationship of a histogram of each value of RGB, a conversion rate, and a converted R value.

FIG. 13 shows target data, binary data, reference data, and converted data.

FIG. 25 is a sequence diagram of a sixth example.

DESCRIPTION OF ILLUSTRATIVE EMBODIMENTS

First Embodiment

Figure 1:
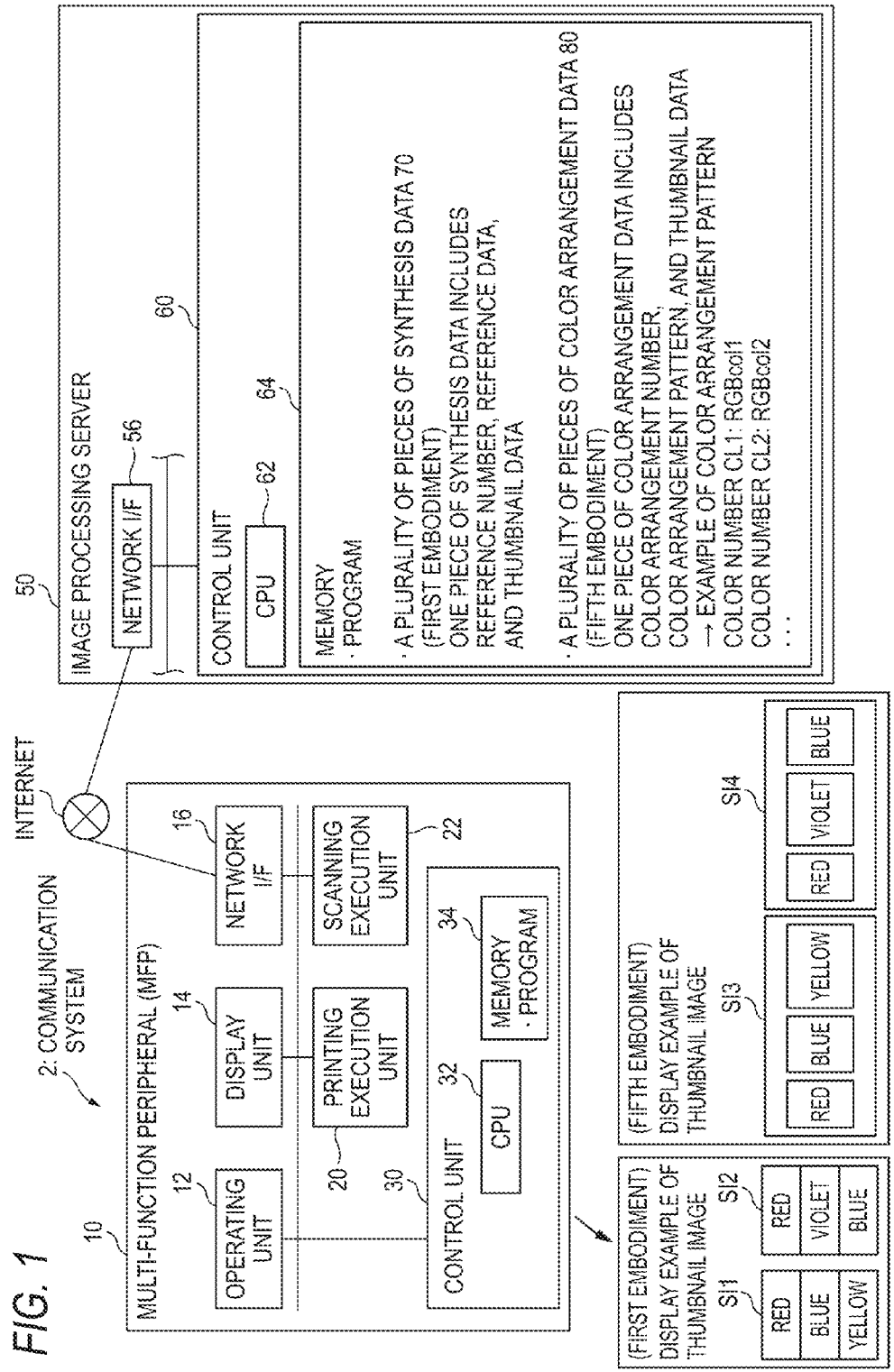
FIG. 1 shows the configuration of a communication system.

As shown in FIG. 1, a communication system 2 includes a multi-function peripheral 10 and an image processing server 50. The multi-function peripheral 10 and the image processing server 50 can perform communication with each other through Internet. Hereinafter, the multi-function peripheral 10 is referred to as "MFP (an abbreviation of Multi-Function Peripheral) 10".

(Configuration of MFP 10)

The MFP 10 is peripheral equipment (that is, peripheral equipment, such as a PC) which can execute multiple functions including a printing function and a scanning function. The MFP 10 includes an operating unit 12, a display unit 14, a network interface 16, a printing execution unit 20, a scanning execution unit 22, and a control unit 30.

The operating unit 12 includes a plurality of keys. A user can operate the operating unit 12 to give various instructions to the MFP 10. The display unit 14 is a display which is provided to display various kinds of information. The network interface 16 is connected to Internet. The printing execution unit 20 is an ink jet type or laser type printing mechanism. The scanning execution unit 22 is a CCD type or CIS type scanning mechanism.

The control unit 30 includes a CPU 32 and a memory 34. The CPU 32 is a processor which executes various kinds of processing according to a program stored in the memory 34. The memory 34 has a RAM, a ROM, or the like.

(Configuration of Image Processing Server 50)

The image processing server 50 is a server which is provided to execute image processing, and is provided on Internet by a vendor of the MFP 10. The image processing server 50 includes a network interface 56 and a control unit 60.

The network interface 56 is connected to Internet. The control unit 60 includes a CPU 62 and a memory 64. The CPU 62 is a processor which executes various kinds of processing according to a program stored in the memory 64. The memory 64 has a RAM, a ROM, or the like.

The memory 64 stores a plurality of pieces of synthesis data 70 in advance. Each of a plurality of pieces of synthesis data 70 is data in which a reference number, reference data, and thumbnail data are associated with one another. The reference number is the number for identifying reference data. Reference data is RGB bitmap data, and is used to convert target data. Reference data has the number of pixels corresponding to postcard size. Reference data is not data in which the pixel values of all pixels are the same (that is, data representing a single color), but data which represents a plurality of regions having a plurality of colors. Thumbnail data is reduced data of reference data.

Figure 2:
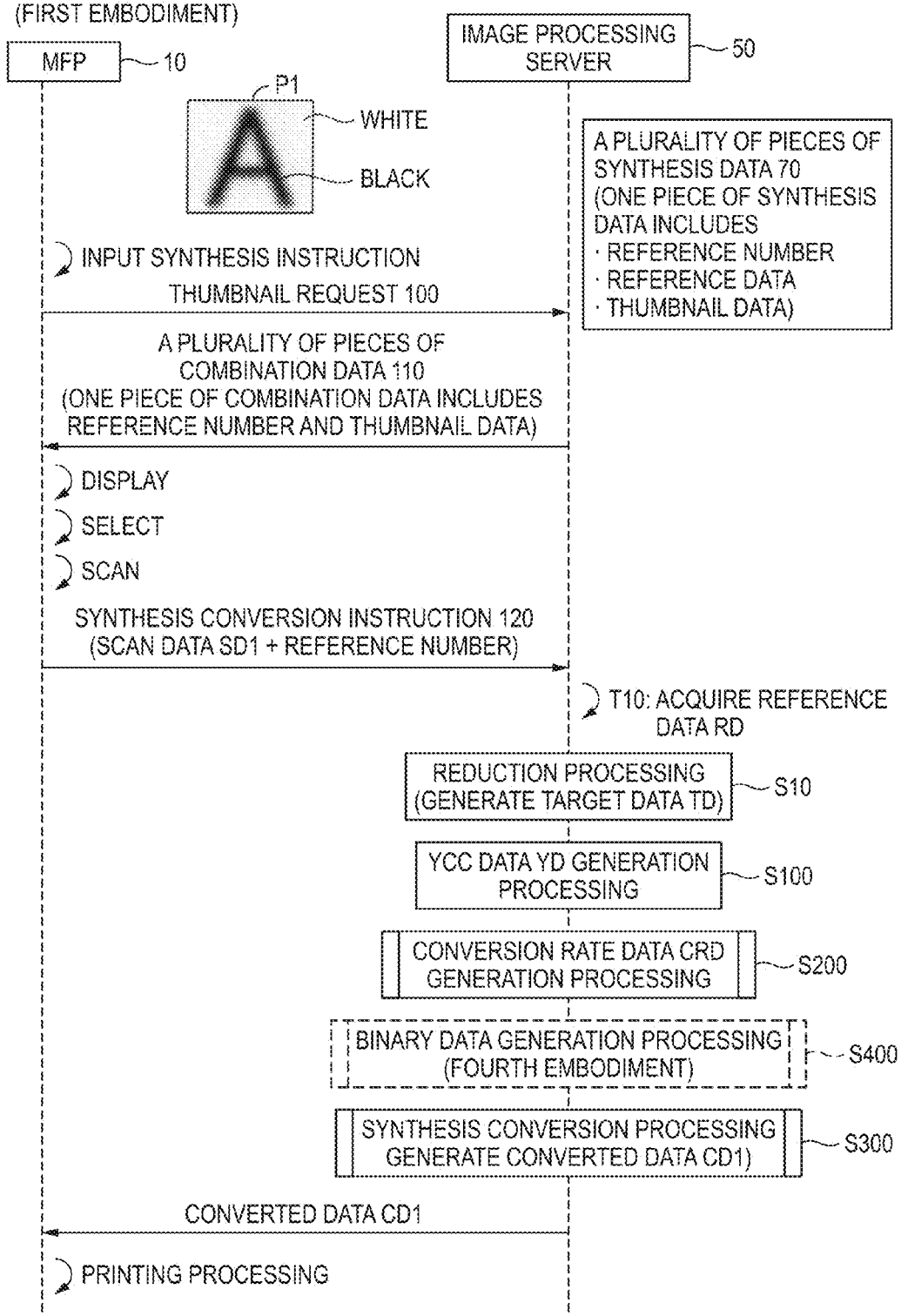
FIG. 2 is a sequence diagram of a first example.

(Processing which is Executed by MFP 10 and Image Processing Server 50; FIG. 2)

Subsequently, processing which is executed by the MFP 10 and the image processing server 50 will be described referring to FIG. 2. The user of the MFP 10 first draws an object, such as a character or a figure, on a sheet P1 of A4 size in handwriting. In the embodiment of FIG. 2, a black character indicative of the letter "A" is drawn on a white sheet P1. Next, the user operates the operating unit 12 of the MFP 10 to input a synthesis instruction to the MFP 10.

If the synthesis instruction is input by the user, the CPU 32 of the MFP 10 transmits a thumbnail request 100 for requesting the transmission of thumbnail data to the image processing server 50.

If the thumbnail request 100 is received from the MFP 10, for each of a plurality of pieces of synthesis data 70, the CPU 62 of the image processing server 50 generates combination data, in which the reference number and thumbnail data included in synthesis data are associated with each other. As a result, the CPU 62 generates a plurality of pieces of combination data 110 from a plurality of pieces of synthesis data 70. Then, the CPU 62 transmits a plurality of pieces of combination data 110 to the MFP 10.

If a plurality of pieces of combination data 110 are received from the image processing server 50, the CPU 32 of the MFP 10 displays a plurality of thumbnail images, which are represented by a plurality of pieces of thumbnail data included in a plurality of pieces of combination data 110, on the display unit 14.

FIG. 1 shows an example of thumbnail images SI1 and SI2 which are displayed in this embodiment. The thumbnail image SI1 includes a red region, a blue region, and a yellow region. The thumbnail image SI2 is an image different from the thumbnail image SI1, and includes a red region, a violet region, and a blue region. The user operates the operating unit 12 to select one thumbnail image while viewing the thumbnail images SI1 and SI2 displayed on the display unit 14.

As shown in FIG. 2, if one thumbnail image is selected by the user, the CPU 32 of the MFP 10 supplies an instruction to scan the sheet P1 to the scanning execution unit 22. With this, the scanning execution unit 22 executes color scanning of the sheet P1 of A4 size to generate scan data SD1. Scan data SD1 is RGB bitmap data having the number of pixels corresponding to A4 size.

Next, the CPU 32 of the MFP 10 acquires the reference number which is associated with thumbnail data representing the selected thumbnail image among a plurality of pieces of combination data 110. The CPU 32 transmits a synthesis conversion instruction 120 including scan data SD1 and the acquired reference number to the image processing server 50.

If the synthesis conversion instruction 120 is received from the MFP 10, in T10, the CPU 62 of the image processing server 50 acquires one piece of reference data RD, which is associated with the reference number included in the synthesis conversion instruction 120, among a plurality of pieces of reference data included in a plurality of pieces of synthesis data 70.

Next, in S10, the CPU 62 of the image processing server 50 executes reduction processing for scan data SD1 included in the synthesis conversion instruction 120. Specifically, the CPU 62 reduces scan data SD1 having the number of pixels corresponding to A4 size to generate target data TD having the number of pixels corresponding to postcard size. For example, when the number of pixels corresponding to A4 size and the number of pixels corresponding to postcard size are respectively "K1" and "K2", the CPU 62 removes (K1−K2) pixels from scan data SD1 having K1 pixels to generate target data TD having K2 pixels.

Figure 3:
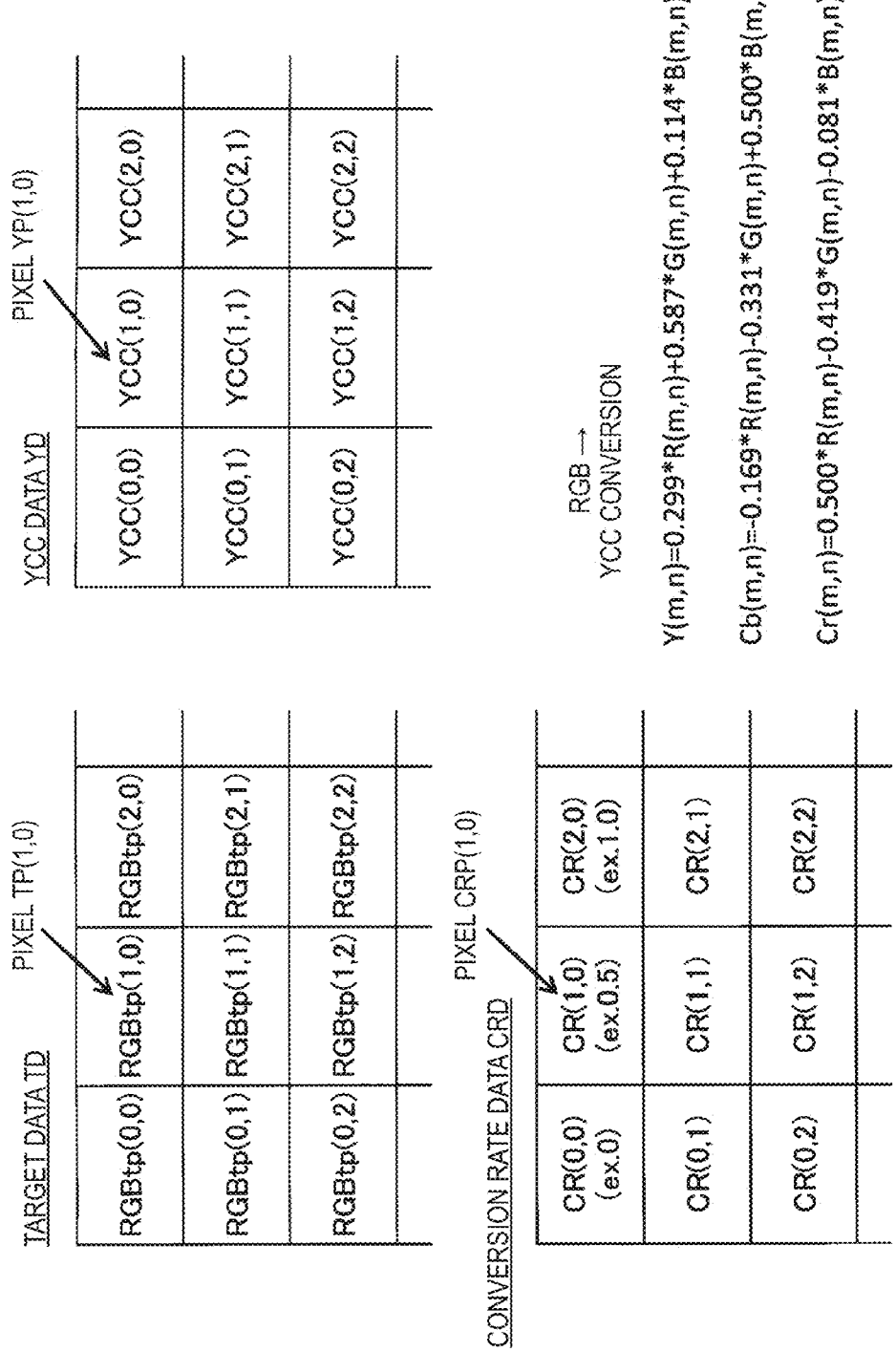
FIG. 3 shows target data, YCC data, and conversion rate data.

FIG. 3 schematically shows a part of each of target data TD, YCC data YD, and conversion rate data CRD. A pixel TP(m,n) in target data TD has a pixel value RGBtp(m,n). The value of "m" indicates the position of each pixel in each piece of data TD in a first direction (in this embodiment, a right-left direction of FIG. 3). The value of "m" increases from a first side toward a second side in the first direction (in this embodiment, from the left side toward the right side of FIG. 3). The value of "n" indicates the position of each pixel in each piece of data TD or the like in a second direction (in this embodiment, an up-down direction of FIG. 3). The value of "n" increases from a first side toward a second side in the second direction (in this embodiment, from an upper side toward a lower side of FIG. 3).

Next, in S100 of FIG. 2, the CPU 62 of the image processing server 50 executes YCC conversion for target data TD to generate YCC data YD having K2 pixels.

A pixel YP(m,n) in YCC data YD of FIG. 3 has a pixel value YCC(m,n). YCC(m,n) includes a luminance value Y(m,n), a first color difference value Cb(m,n), and a second color difference value Cr(m,n). FIG. 3 shows a conversion expression for YCC conversion. In the conversion expression, R(m,n), G(m,n), and B(m,n) are respectively an R value, a G value, and a B value of a pixel TP(m,n) in target data TD. The higher the density of the pixel TP(m,n), the smaller Y(m,n).

Next, in S200 of FIG. 2, the CPU 62 of the image processing server 50 generates conversion rate data CRD using YCC data YD having K2 pixels.

A pixel CRP(m,n) in conversion rate data CRD of FIG. 3 has a pixel value CR(m,n). CR(m,n) is a value which coincides with a conversion rate described below, and has a value in a range of "0" to "1".

Next, in S300 of FIG. 2, the CPU 62 of the image processing server 50 executes synthesis conversion processing for target data TD using conversion rate data CRD and reference data RD. With this, the CPU 62 generates converted data CD1 having K2 pixels. Then, the CPU 62 transmits converted data CD1 to the MFP 10.

If converted data CD1 is received from the MFP 10, the CPU 32 of the MFP 10 supplies converted data CD1 to the printing execution unit 20. As a result, the printing execution unit 20 prints an image represented by converted data CD1 on a sheet of postcard size. With this, the printed sheet can be provided to the user.

Figure 4:
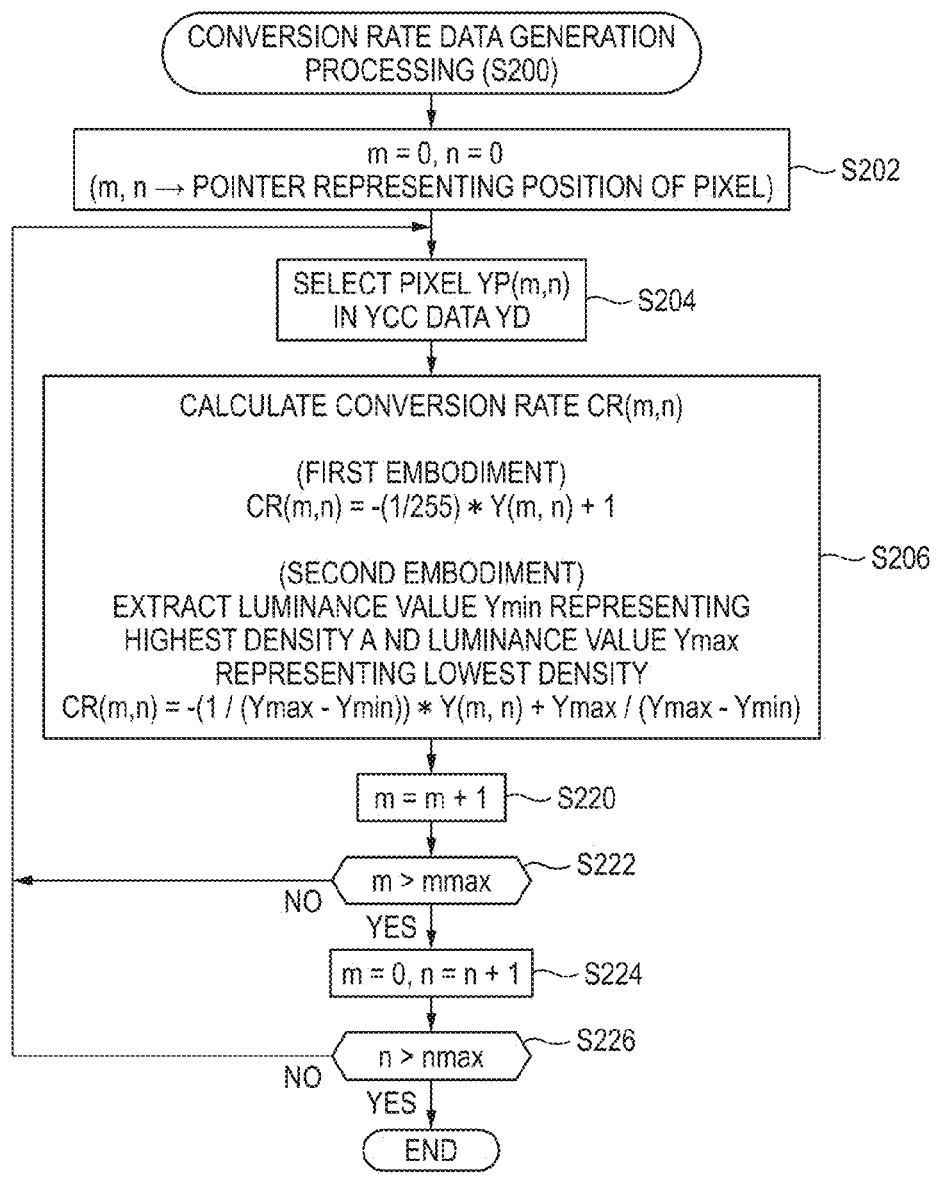
FIG. 4 is a flowchart of conversion rate data generation processing.

(Conversion Rate Data Generation Processing; FIG. 4)

Subsequently, the details of conversion rate data generation processing in S200 of FIG. 2 will be described referring to FIG. 4. In S202, the CPU 62 of the image processing server 50 sets the value of each of pointers m and n indicative of the position of the pixel to "0". In S204, the CPU 62 selects one pixel YP(m,n) in YCC data YD.

Next, in S206, the CPU 62 calculates a conversion rate CR(m,n) using the pixel value YCC(m,n) of the pixel YP(m,n). Specifically, the CPU 62 calculates CR(m,n) according to a numerical expression (of the first embodiment) in S206. The CPU 62 stores the calculated CR(m,n) as the pixel value of the pixel CRP(m,n) in conversion rate data CRD.

The graph (of the first embodiment) of FIG. 5 is a graph which corresponds to the numerical expression (of the first embodiment) in S206 of FIG. 4. The graph represents the relationship between the luminance value Y(m,n) and the conversion rate CR(m,n). The larger Y(m,n), that is, the lower the density of the pixel TP(m,n) in target data TD, the smaller CR(m,n). In other words, the smaller Y(m,n), that is, the higher the density of the pixel TP(m,n) in target data TD, the larger CR(m,n).

Next, in S220 of FIG. 4, the CPU 62 adds "1" to the current value of the pointer m to set a new value of the pointer m. Next, in S222, the CPU 62 performs determination about whether or not the value of the pointer m is greater than mmax. mmax is a value which coincides with the number of pixels in the first direction of YCC data YD (that is, the number of pixels arranged in the right-left direction of FIG. 3).

When it is determined that the value of the pointer m is greater than mmax (YES in S222), in S224, the CPU 62 sets the value of the pointer m to "0", and adds "1" to the current value of a pointer n to set a new value of the pointer n. Next, in S226, the CPU 62 performs determination about whether or not the value of the pointer n is greater than nmax. nmax is a value which coincides with the number of pixels in the second direction of YCC data YD (that is, the number of pixels arranged in the up-down direction of FIG. 3).

When it is determined that the value of the pointer m is equal to or less than mmax (NO in S222) or when the value of the pointer n is equal to or less than nmax (NO in S226), the CPU 62 returns to S204. With this, the CPU 62 selects a new pixel YP(m,n) in YCC data YD and executes the calculation processing in S206 again.

When it is determined that the value of the pointer n is greater than nmax (YES in S226), the CPU 62 determines that the calculation processing in S206 is executed for all pixels in target data TD, and ends the conversion rate data generation processing. With this, conversion rate data CRD (see FIG. 3) is completed.

Figure 6:
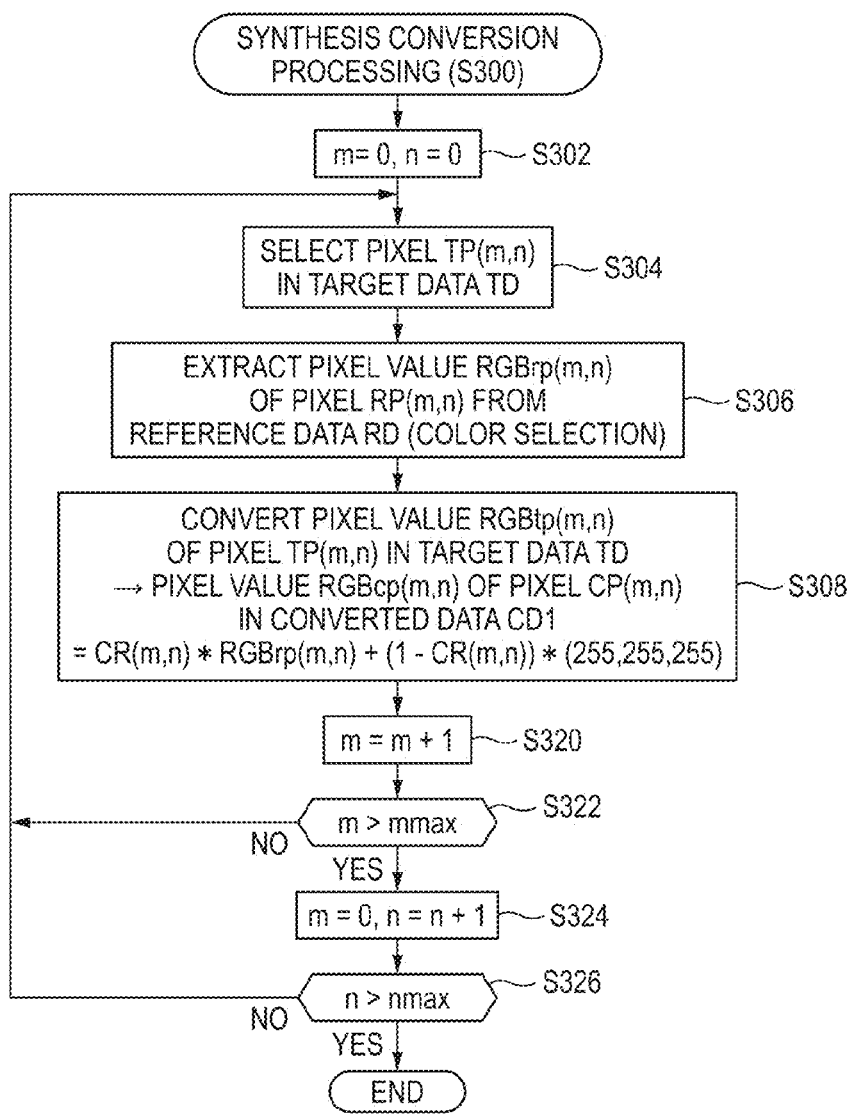
FIG. 6 is a flowchart of synthesis conversion processing.

(Synthesis Conversion Processing; FIG. 6)

Subsequently, the details of the synthesis conversion processing in S300 of FIG. 2 will be described referring to FIG. 6. In S302, the CPU 62 of the image processing server 50 sets the value of each of the pointers m and n indicative of the position of the pixel to "0". In S304, the CPU 62 selects one pixel TP(m,n) in target data TD.

In S306, the CPU 62 extracts a pixel value RGBrp(m,n) of a pixel RP(m,n) from reference data RD acquired in T10 of FIG. 2. With this, the CPU 62 selects a conversion color (that is, a color indicated by RGBrp(m,n)) for converting the pixel value of TP(m,n) selected in S304.

In S308, the CPU 62 converts the pixel value of the pixel TP(m,n) selected in S304 using RGBrp(m,n) extracted in S306. Specifically, the CPU 62 first extracts the pixel value CR(m,n) of the pixel CRP(m,n) from conversion rate data CRD. Then, the CPU 62 calculates RGBcp(m,n) according to a numerical expression in S308 to convert the pixel value of the pixel TP(m,n) to the calculated RGBcp(m,n). With this, the CPU 62 stores the calculated RGBcp(m,n) as the pixel value of the pixel CP(m,n) in converted data CD1.

S320 to S326 are the same as S220 to S226 of FIG. 4. If it is determined to be YES in S326, the synthesis conversion processing ends. With this, converted data CD1 in which reference data RD is synthesized with target data TD using conversion rate data CRD is completed.

Figure 7:
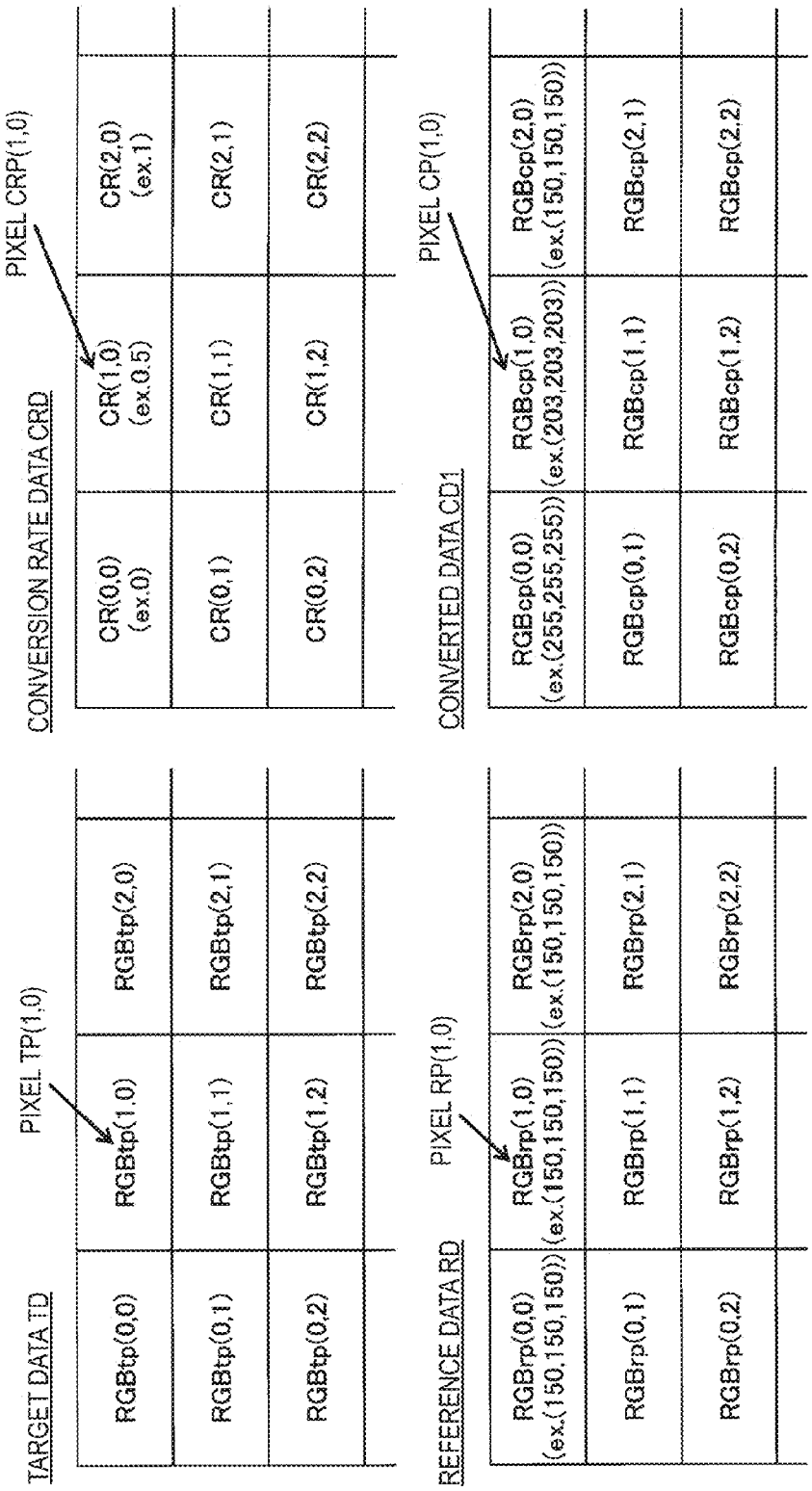
FIG. 7 shows target data, conversion rate data, reference data, and converted data.

FIG. 7 schematically shows a part of each of target data TD, conversion rate data CRD, reference data RD, and converted data CD1. In conversion rate data CRD, CR(0,0), CR(0,1), and CR(0,2) are respectively "0", "0.5", and "1". In reference data RD, RGBrp(0,0), RGBrp(0,1), and RGBrp (0,2) have the same value (150,150,150). In this case, in converted data CD1, RGBcp(0,0) is (255,255,255), RGBcp (0,1) is (203,203,203), and RGBcp(0,2) is (150,150,150).

Figure 8:
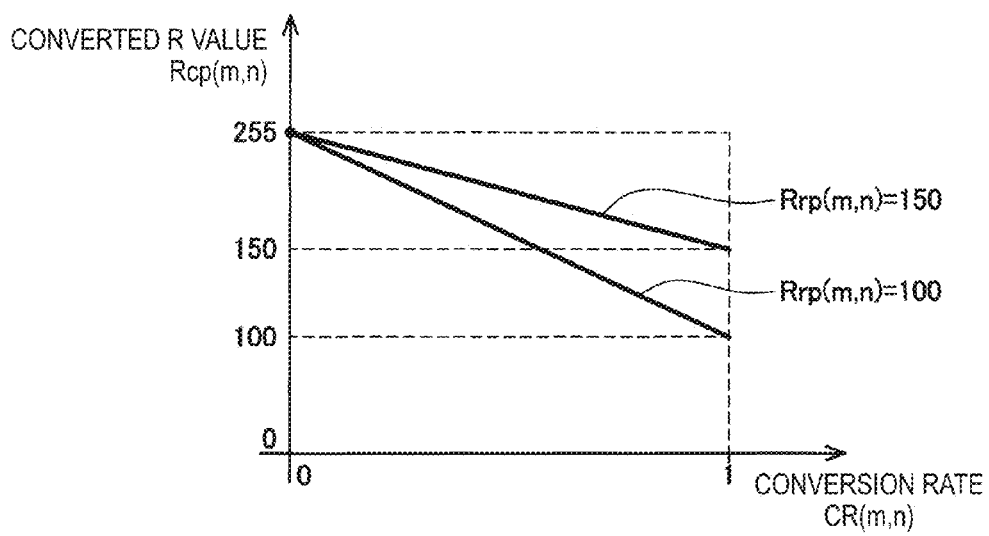
FIG. 8 is a graph showing the relationship between a conversion rate and a converted R value.

FIG. 8 is a graph showing the relationship between CR(m,n) and Rcp(m,n) which is the R value in RGBcp(m,n). FIG. 8 shows a numerical expression (that is, the same numerical expression as the numerical expression in S308 of FIG. 6) for calculating RGBcp(m,n). In the numerical expression, Rrp(m,n), Grp(m,n), and Brp(m,n) respectively indicate the R value, the G value, and the B value of the pixel RP(m,n) in reference data RD. Gcp(m,n) and Bcp(m,n) respectively represent the G value and the B value in RGBcp(m,n).

(255,255,255) in the numerical expression of FIG. 8 is an RGB value indicative of the color (that is, white) of a background image in a target image represented by target data TD. In this embodiment, the RGB value indicative of the color of the background image is predetermined regardless of the actual pixel value of each pixel in target data TD.

When CR(m,n) is "0", Rcp(m,n) coincides with "255", and when CR(m,n) is "1", Rcp(m,n) coincides with Rrp(m, n) (for example, "150" or "100"). That is, the smaller CR(m,n), the closer Rcp(m,n) to the R value (that is, 255) in the RGB value indicative of the color of the background image, and the larger CR(m,n), the closer Rcp(m,n) to the value of Rrp(m,n). As will be apparent from the graph of FIG. 8, Rcp(m,n) changes linearly with CR(m,n).

In regards to the G value and the B value, the same relationship as the R value is obtained. Accordingly, the smaller CR(m,n), the closer RGBcp(m,n) to the RGB value (255,255,255) indicative of the color of the background image, and the larger CR(m,n), the closer RGBcp(m,n) to RGBrp(m,n).

(Example of Image Conversion; FIGS. 9A to 9D)

Figure 9A:
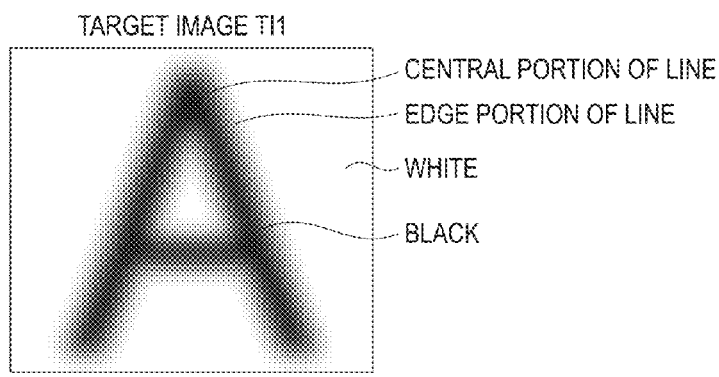
FIGS. 9A to 9D show a situation in which a target image is converted.

FIG. 9A shows an example of a target image TI1 represented by target data TD. The target image TI1 includes a white background image, an object image (that is, an image corresponding to an object drawn by the user in handwriting) indicative of a black character "A". Since the character "A" is drawn with, for example, a pen, the central portion of a line forming the character "A" has high density, and the edge portion of the line forming the character "A" has low density. That is, the density is gradually lowered from the central portion of the line forming the character "A" toward the edge portion of the line.

Figure 9B:
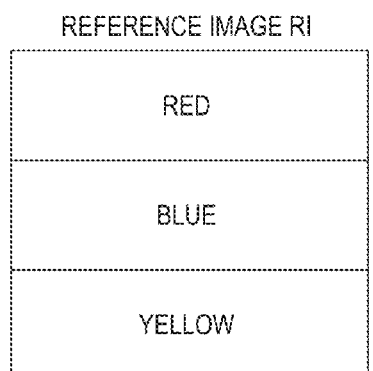

FIG. 9B shows an example of a reference image RI represented by reference data RD. As described above, the user selects one thumbnail image among a plurality of thumbnail images SI1 and SI2 (see FIG. 1). Then, the image processing server 50 acquires reference data RD corresponding to the selected thumbnail image (see T10 of FIG. 2). The reference image RI of FIG. 9B is an image which is represented by reference data RD acquired by the image processing server 50 when the thumbnail image SI1 is selected by the user. The reference image RI includes a red region, a blue region, and a yellow region.

It is assumed that the image processing server 50 uses a method of a comparative example described below. That is, the image processing server 50 converts the pixel value of each pixel (hereinafter, referred to as "high-density pixel") having density equal to or higher than predetermined density among a plurality of pixels in target data TD without using conversion rate data CRD. That is, the image processing server 50 converts the pixel value of a high-density pixel TP(m,n) in target data TD to a value coinciding with the pixel value of the pixel RP(m,n) in reference data RD regardless of the conversion rate CR(m,n). Then, the image processing server 50 converts the pixel value of each pixel (hereinafter, referred to as "low-density pixel") having density lower than predetermined density among a plurality of pixels in target data TD to an RGB value indicative of a predetermined color (for example, white) of a background image without using conversion rate data CRD. That is, the image processing server 50 converts the pixel value of a low-density pixel TP(m,n) in the target data TD to an RGB value (255,255,255) indicative of white regardless of the conversion rate CR(m,n).

Figure 9C:
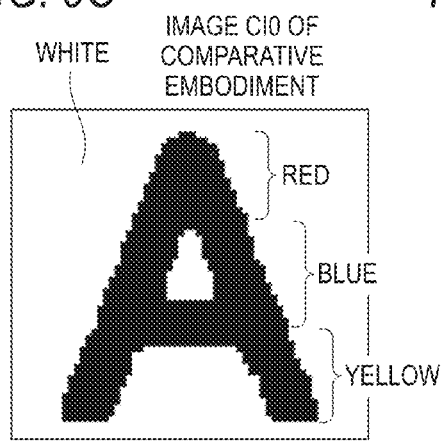
Figure 9D:
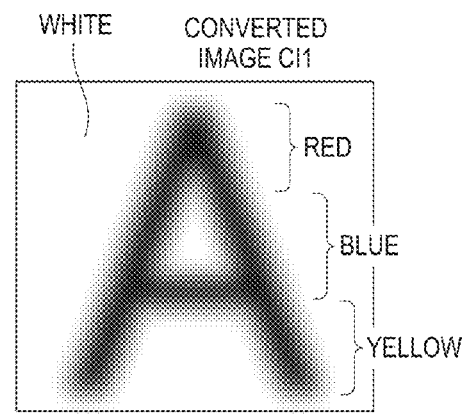

FIG. 9C shows an image CI0 which is represented by converted data generated by the method of the comparative example. As described above, in the target image TI1, the density is gradually lowered from the central portion of the line forming the character "A" toward the edge portion of the line. Accordingly, in a converted object image (that is, character "A") in the image CI0 of the comparative example, while a region corresponding to the central portion has a color (for example, red) included in the reference image RI, a region corresponding to the edge portion is divided into a portion which has a color included in the reference image RI and a portion which has white. As a result, in an edge portion of the converted object image, unlike the edge portion of the object image in the target image TI1, the density does not change smoothly. That is, although the user intentionally draws an object with change in density, change in density is not expressed in the converted object image.

In contrast, in this embodiment, for each of a plurality of pixels in target data TD, the image processing server 50 calculates the conversion rate of the pixel (see S100 and S200 of FIG. 2 and FIG. 4), and converts the pixel value of the pixel according to the conversion rate (see S300 of FIG. 2 and FIG. 6). As a result, for example, the image processing server 50 can generate converted data CD1 which represents a converted image CI1 shown in FIG. 9D.

In the converted object image (that is, the character "A") of the converted image CI1, the color included in the reference image RI becomes lighter from the central portion of the line forming the character "A" toward the edge portion of the line (that is, becomes close to white). Accordingly, for example, when a converted object image is generated from an object image which represents an object drawn with a pen, the converted object image with the feeling of the pen can be obtained. In this way, according to the method of this embodiment, it is possible to provide the user with an appropriate converted image CI1 in which the density of each region in the target image TI1 is reflected.

The converted image CI1 includes a white background image, and a converted object image (that is, the character "A") which has the same pattern (that is, red, blue, and yellow) as the reference image RI. In other words, the converted image CI1 includes a converted object image which has a shape corresponding to the object (that is, the character "A") drawn by the user and has the same pattern as the reference image RI having a plurality of colors. Accordingly, it is possible to provide the user with an interesting converted image CI1.

According to this embodiment, the user can easily acquire an interesting card which should be used in, for example, a New Year's card or a Christmas card. That is, the user draws an object on the sheet P1 of A4 size in handwriting. Then, the user selects a desired thumbnail image SI1 among a plurality of thumbnails SI1 and SI2, and causes the MFP 10 to scan the sheet P1. With this, the user can easily acquire a sheet of postcard size on which the converted image CI1 is printed.

(Correspondence Relationship)

The image processing server 50 is an example of "image processing apparatus". The luminance value Y(m,n) is an example of "density relation value". All pixels in target data TD are an example of "object pixel". The reference image RI and reference data RD are respectively examples of "specific image" and "specific data". For example, three colors included in the reference image RI of FIG. 9B are an example of "a plurality of colors". A pixel in reference data RD is an example of "corresponding pixel". The RGB value (255,255,255) which is used by the numerical expression in S308 of FIG. 6 and indicates white is an example of "specific value".

The processing of S10, the processing of T10, and the processing of S100 of FIG. 2 are respectively examples of processing to be executed by "target data acquisition unit", "specific data acquisition unit", and "calculation unit". The processing of S306 and the processing of S308 of FIG. 6 are respectively examples of processing to be executed by "selection unit" and "conversion unit". In FIG. 2, processing for transmitting converted data CD1 to the MFP 10 is an example of processing to be executed by "output unit".

Second Embodiment

In this embodiment, the method of calculating the conversion rate CR(m,n) in S206 of FIG. 4 is different from that in the first embodiment.

In S206, the CPU 62 of the image processing server 50 first extracts a minimum luminance value Ymin and a maximum luminance value Ymax among all luminance values in YCC data YD. With this, the CPU 62 extracts a luminance value Ymin indicative of highest density and a luminance value Ymax indicative of lowest density among all luminance values in YCC data YD.

Next, the CPU 62 calculates the conversion rate CR(m,n) according to a numerical expression (of the second embodiment) in S206. As shown in the numerical expression, the CPU 62 calculates the conversion rate CR(m,n) based on the difference between the maximum luminance value Ymax and the minimum luminance value Ymin, and the luminance value Y(m,n).

A graph (of the second embodiment) of FIG. 5 is a graph corresponding to the numerical expression (of the second embodiment) in S206 of FIG. 4. For example, when Ymax is "255" and Ymin is "0", the same graph as the graph in the first embodiment is obtained. However, when Ymax is smaller than "255" and Ymin is greater than "0", a one-dot-chain line graph is obtained.

In this embodiment, when Y(m,n) coincides with Ymin, the conversion rate CR(m,n) has the maximum value "1". When Y(m,n) coincides with Ymax, the conversion rate CR(m,n) has the minimum value "0". As a result, in S308 of FIG. 6, the CPU 62 converts the pixel value of the pixel TP(m,n) having Ymin to a value coinciding with the pixel value of the pixel RP, and converts the pixel value of the pixel TP(m,n) having Ymax to the RGB value (255,255,255) coinciding with the color (that is, white) of the background image.

For example, it is assumed that the user draws a character "A" of a light color (for example, gray) on a sheet P1 (for example, straw paper) with inferior whiteness compared to high quality paper by a pencil or the like and causes the MFP 10 to scan the sheet P1. In this case, according to the method of this embodiment, among a plurality of pixels in target data TD, a pixel representing the character "A" has the highest density (that is, the minimum luminance value Ymin), and the conversion rate of the pixel has the maximum value "1". As a result, the converted object image (that is, the character "A") in the converted image CI1 represents each color which coincides with each color in the reference image RI. Among a plurality of pixels in target data TD, a pixel representing the background image (that is, the color of the sheet P1) has the lowest density (that is, the maximum luminance value Ymax), and the conversion rate of the pixel has the minimum value "0". As a result, the background image in the converted image CI1 has white. In this way, according to this embodiment, the converted image CI1 including the converted object image, which represents each color coinciding with each color in the reference image RI, and the white background image can be provided to the user regardless of the density of the object drawn by the user or the sheet to be scanned.

(Correspondence Relationship)

In this embodiment, Ymin and Ymax are respectively examples of "first density relation value" and "second density relation value". The processing for extracting Ymin and Ymax in S206 of FIG. 4 is an example of processing to be executed by "extraction unit".

Third Embodiment

In the above-described embodiments, the image processing server 50 uses white which is predetermined as the color of the background image in the target image TI1 (see (255,255,255) of the numerical expression in S308 of FIG. 6). With this, in this embodiment, the image processing server 50 decides the color of the background image in the target image TI1 using target data TD.

Figure 10:
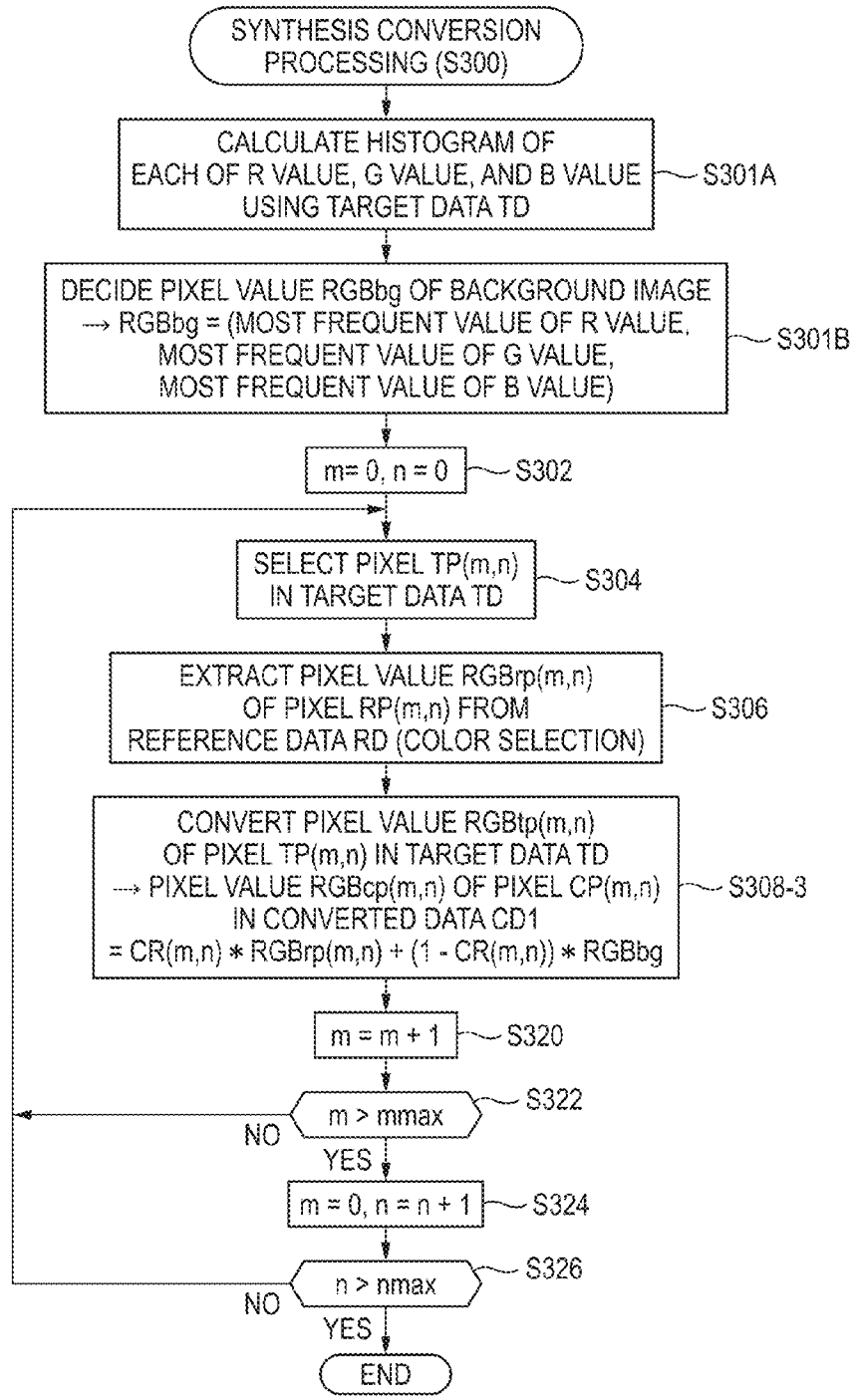
FIG. 10 is a flowchart of synthesis conversion processing of a third example.

(Synthesis Conversion Processing; FIG. 10)

The details of the synthesis conversion processing (that is, processing of S300 of FIG. 2) of this embodiment will be described referring to FIG. 10. In FIG. 10, the same kinds of processing as in FIG. 6 of the first embodiment are represented by the same reference numerals as in FIG. 6. Here, S301A, S301B, and S308-3 peculiar to this embodiment will be described.

In S301A, the CPU 62 of the image processing server 50 calculates the histogram of each of the R value, the G value, and the B value in target data TD. FIG. 11 shows an example of three histograms calculated in S301A.

Next, in S301B of FIG. 10, the CPU 62 decides the color of the background image in the target image TI1 represented by target data TD. Specifically, the CPU 62 extracts the most frequent R value from the histogram of the R value to decide an R value Rbg indicative of the color of the background image. Similarly, the CPU 62 respectively extracts the most frequent G value and B value from the histograms of the G value and the B value to decide a G value Gbg and a B value Bbg indicative of the color of the background image. With this, the CPU 62 decides RGBbg(Rbg,Gbg,Bbg) which is the RGB value indicative of the color of the background image in the target image TI1.

In S308-3, the CPU 62 calculates RGBcp(m,n) according to a numerical expression in S308-3. In the numerical expression, unlike S308 of FIG. 6, RGBbg decided in S301B is used as the RGB value indicative of the color of the background image.

FIG. 11 is a graph showing the relationship between CR(m,n) and Rcp(m,n) which is the R value in RGBcp(m,n). When CR(m,n) is "0", Rcp(m,n) coincides with Rbg, and when CR(m,n) is "1", Rcp(m,n) coincides with Rrp(m,n) (for example, "150" or "100"). That is, the smaller CR(m,n), the closer Rcp(m,n) to Rbg indicative of the color of the background image, and the larger CR(m,n), the closer Rcp (m,n) to the value of Rrp(m,n). In regards to the G value and the B value, the same relationship as the R value is obtained. Accordingly, the smaller CR(m,n), the closer RGBcp(m,n) to RGBbg indicative of the color of the background image, and the larger CR(m,n), the closer RGBcp(m,n) to RGBrp (m,n).

For example, it is assumed that the user draws an object (for example, the character "A") on a sheet having a specific color other than white, instead of the white sheet P1 (see FIG. 2), and causes the MFP 10 to scan the sheet. In this case, according to the method of this embodiment, the image processing server 50 decides RGBbg indicative of the specific color as the RGB value indicative of the color of the background image. Then, the image processing server 50 converts the pixel value of the pixel TP(m,n) in target data TD such that, the smaller CR(m,n), the closer the pixel value to RGBbg indicative of the color of the background image. As a result, a converted image includes a background image which has the specific color or a similar color. Accordingly, if a target image which includes a background image having a desired color is prepared, the user can acquire a converted image which includes a background image having the color or a similar color.

(Correspondence Relationship)

In this embodiment, RGBbg is an example of "specific value". The processing of S301A and S301B of FIG. 10 is an example of processing to be executed by "decision unit".

Fourth Embodiment

In the above-described embodiments, the image processing server 50 handles all of a plurality of pixels included in target data TD as a pixel to be converted (see FIG. 6). In contrast, in this embodiment, the image processing server 50 converts the pixel value of each pixel, which has a color within a predetermined achromatic color range, among a plurality of pixels included in target data TD, but does not convert the pixel value of each pixel which has a color within a predetermined chromatic color range.

As shown in FIG. 2, the CPU 62 of the image processing server 50 executes the conversion rate data generation processing of S200, and then executes binary data generation processing in S400 to generate binary data BD. Then, in S300, the CPU 62 executes synthesis conversion processing for target data TD using conversion rate data CRD and binary data BD.

Figure 12:
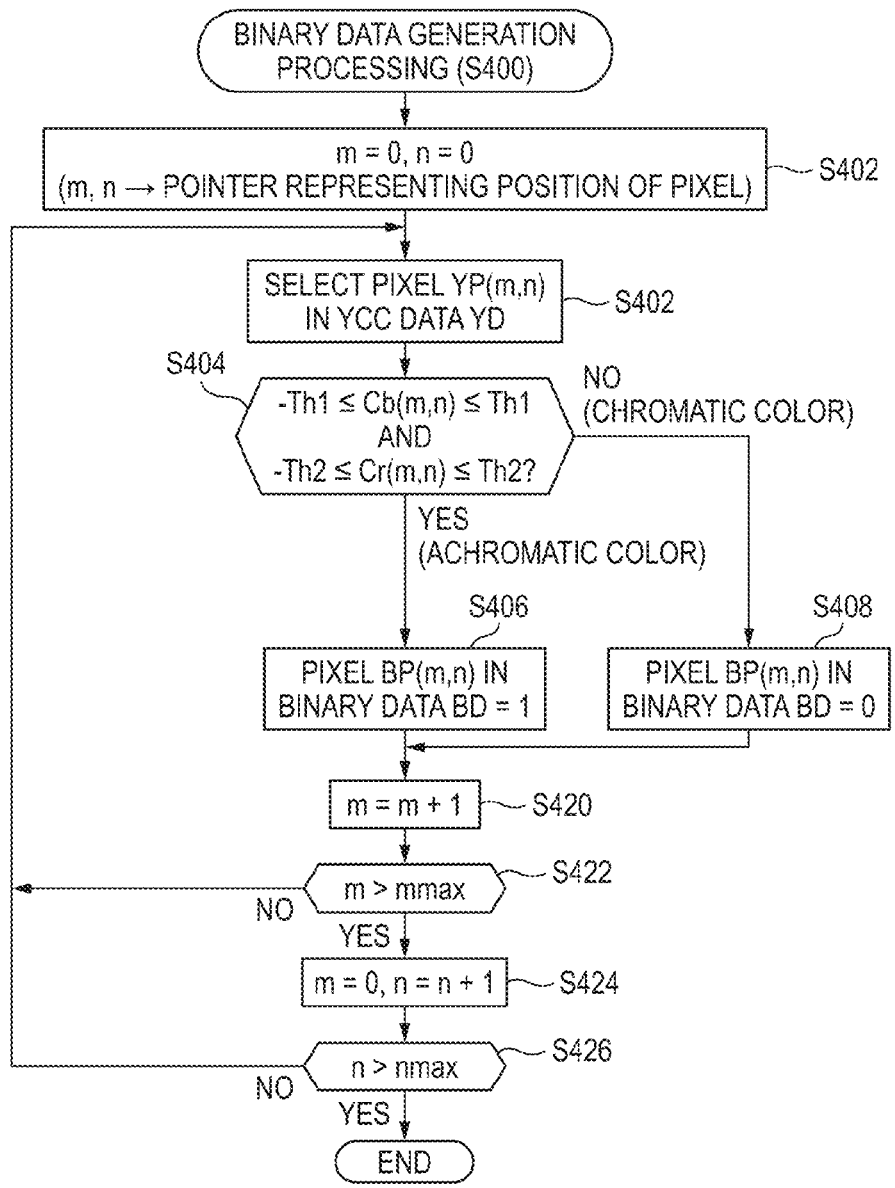
FIG. 12 is a flowchart of binary data generation processing of a fourth example.

(Binary Data Generation Processing; FIG. 12)

The details of the binary data generation processing of S400 of FIG. 2 will be described referring to FIG. 12. In S402, the CPU 62 of the image processing server 50 sets the value of each of the pointers m and n indicative of the position of the pixel to "0". In S404, the CPU 62 selects one pixel YP(m,n) in YCC data YD.

Next, in S404, the CPU 62 performs determination about whether the pixel YP(m,n) has a color within a predetermined achromatic color range or a color within a predetermined chromatic color range. The predetermined achromatic color range is a range which includes black (that is, RGB= (0,0,0)) and a color close to black. Specifically, a range in which the absolute value of the first color difference value Cb(m,n) is equal to or less than a first threshold value Th1 and the absolute value of the second color difference value Cr(m,n) is equal to or less than a second threshold value Th2 is the predetermined achromatic color range. A range in which the absolute value of the first color difference value Cb(m,n) is greater than the threshold value Th1 and the absolute value of the second color difference value Cr(m,n) is greater than the threshold value Th2 is the predetermined chromatic color range. Each of Cb(m,n) and Cr(m,n) is a numerical value within a range of −128 to 127. When each of Cb(m,n) and Cr(m,n) is within a range of −15 to 15, the CPU 62 determines that the pixel YP(m,n) has a color within the predetermined achromatic color range. That is, in this embodiment, each of the threshold value Th1 and the threshold value Th2 is "15". However, in a modification embodiment, a numerical value other than "15" may be used, and the threshold value Th1 and the threshold value Th2 may be different numerical values.

In S404, when the absolute value of the first color difference value Cb(m,n) is equal to or less than the first threshold value Th1 and the absolute value of the second color difference value Cr(m,n) is equal to or less than the second threshold value Th2, the CPU 62 determines that the pixel YP(m,n) has a color within the predetermined achromatic color range (YES in S404), and progresses to S406. In S406, the CPU 62 stores "1" as the pixel value of a pixel BP(m,n) in binary data BD. If S406 ends, the process progresses to S420.

In S404, when the absolute value of the first color difference value Cb(m,n) is greater than the first threshold value Th1 or when the absolute value of the second color difference value Cr(m,n) is greater than the second threshold value Th2, the CPU 62 determines that the pixel YP(m,n) has a color within the predetermined chromatic color range (NO in S404), and progresses to S408. In S408, the CPU 62 stores "0" as the pixel value of the pixel BP(m,n) in binary data BD. If S408 ends, the process progresses to S420.

S420 to S426 are the same as S220 to S226 of FIG. 4. If it is determined to be YES in S426, the binary data generation processing ends. With this, binary data BD is completed. FIG. 13 shows an example of binary data BD including pixels, in which "1" or "0" is described.

Figure 14:
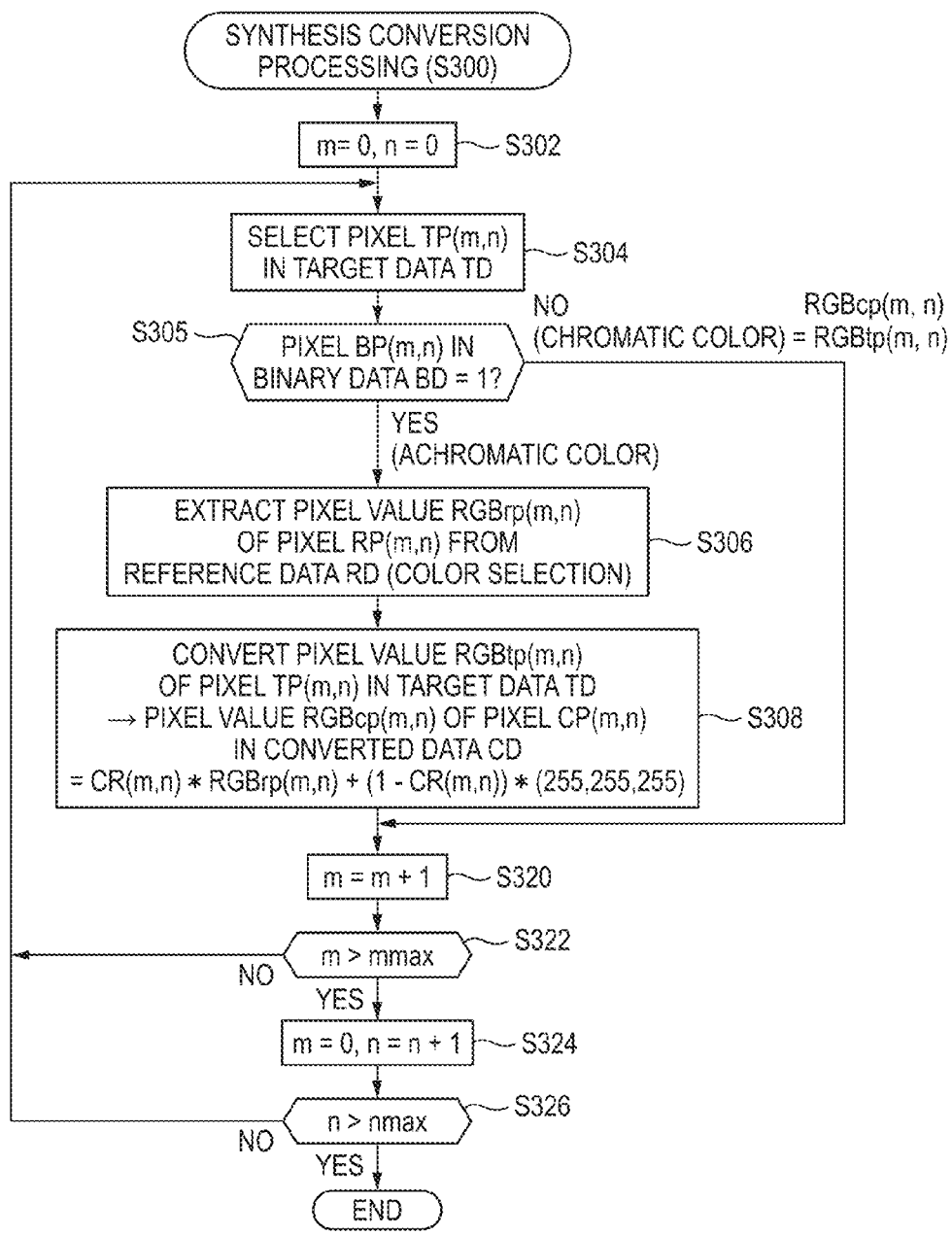
FIG. 14 is a flowchart of synthesis conversion processing of a fourth example.

(Synthesis Conversion Processing; FIG. 14)

The details of the synthesis conversion processing (that is, the processing of S300 of FIG. 2) of this embodiment will be described referring to FIG. 14. In FIG. 14, the same kinds of processing as in FIG. 6 of the first embodiment are represented by the same reference numerals as in FIG. 6. Here, S305 peculiar to this embodiment will be described.

In S305, the CPU 62 of the image processing server 50 performs determination about whether or not the pixel value of the pixel BP(m,n) in binary data BD is "1". That is, the CPU 62 performs determination about whether or not the pixel TP(m,n) in target data TD has a color within the predetermined achromatic color range.

In S305, when it is determined that the pixel value of the pixel BP(m,n) is "1", that is, when the pixel TP(m,n) has a color within the predetermined achromatic color range (YES in S305), the CPU 62 executes S306 and S308 to convert the pixel value of the pixel TP(m,n).

For example, in binary data BD of FIG. 13, the pixel value of a pixel BP(1,1) is "1". Accordingly, the CPU 62 converts the pixel value RGBtp(1,1) of a pixel TP(1,1) in target data TD. As a result, the pixel value RGBcp(1,1) of a pixel CP(1,1) in converted data CD1 becomes a converted value.

In S305 of FIG. 14, when it is determined that the pixel value of the pixel BP(m,n) is "0", that is, when the pixel TP(m,n) has a color within the predetermined chromatic color range (YES in S305), the CPU 62 skips S306 and S308, and progresses to S320. That is, the CPU 62 does not convert the pixel value of the pixel TP(m,n).

For example, in binary data BD of FIG. 13, the pixel value of a pixel BP(0,0) is "0". Accordingly, the CPU 62 does not convert the pixel value RGBtp(0,0) of a pixel TP(0,0) in target data TD. As a result, the pixel value RGBcp(0,0) of the pixel CP(0,0) in converted data CD1 coincides with the pixel value RGBtp(0,0).

(Example of Image Conversion; FIGS. 15A to 15D)

Figure 15A:
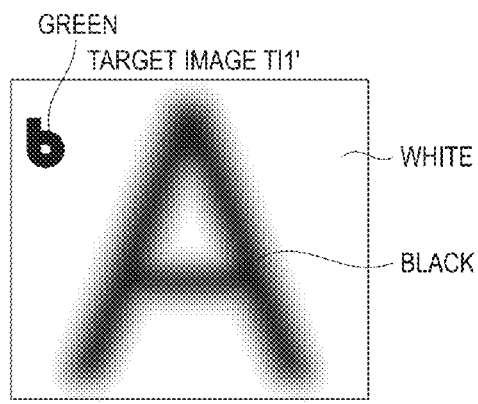
FIGS. 15A to 15D show a situation in which a target image is converted.
Figure 15B:
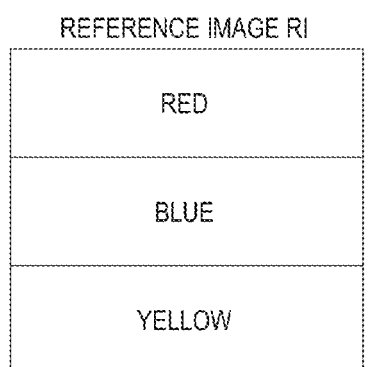

FIG. 15A shows a target image TI1' of this embodiment. The target image TI1' includes a white background image, an object image indicative of a black character "A", and an object image indicative of a green character "b". FIG. 15B shows the same reference image RI (see FIG. 9B) as in the first embodiment.

Figure 15C:
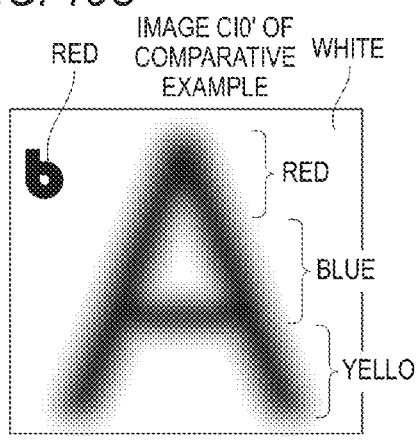

In a comparative example, as in the first embodiment, the image processing server 50 converts the pixel value of each pixel, which represents an object image indicative of the green character "b", among a plurality of pixels in target data TD using reference data RD (see FIG. 6). As a result, as shown in FIG. 15C, a converted image CI0' includes a converted object image indicative of a character "b" having red or a similar color.

Figure 15D:
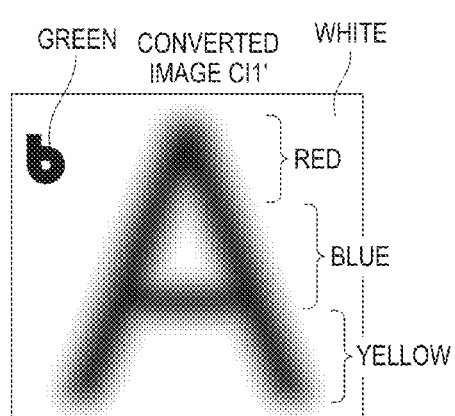

In contrast, in this embodiment, the image processing server 50 performs determination about whether or not each pixel, which represents the object image indicative of the green character "b", among a plurality of pixels in target data TD has a color within the predetermined chromatic color range (NO in S404 of FIG. 12). For this reason, the image processing server 50 does not convert the pixel value of each pixel which represents the object image indicative of the green character "b" (NO in S305 of FIG. 14). As a result, as shown in FIG. 15D, a converted image CI1' includes the object image indicative of the green character "b".

According to this embodiment, when an object (for example, the green character "b") having a color within the predetermined chromatic color range is drawn by the user, the image processing server 50 can provide the user with the converted image CI1' which includes the object image having the color. Then, when an object (for example, the black character "A") having a color within the predetermined achromatic color range is drawn by the user, the image processing server 50 can provide the user with the converted image CI1' which includes the converted object image having the same pattern as the reference image RI.

Accordingly, it is possible to provide the user with an interesting converted image CI1' according to the color of the object drawn by the user.

(Correspondence Relationship)

In this embodiment, among a plurality of pixels in target data TD, a pixel having a color within a predetermined achromatic color range and a pixel having a color within a predetermined chromatic color range are respectively examples of "specific pixel" and "object pixel".

Fifth Embodiment

In the above-described embodiments, the image processing server 50 executes the synthesis conversion processing using reference data RD corresponding to the thumbnail image selected by the user (see S300 of FIG. 2). In contrast, in this embodiment, the image processing server 50 executes color arrangement conversion processing using a color arrangement pattern corresponding to the thumbnail image selected by the user.

As shown in FIG. 1, the memory 64 of the image processing server 50 stores a plurality of pieces of color arrangement data 80 in advance. Each of a plurality of pieces of color arrangement data 80 is data in which a color arrangement number, a color arrangement pattern, and thumbnail data are associated with one another. The color arrangement number is the number for identifying a color arrangement pattern. The color arrangement pattern is information in which, for each of a plurality of colors, a color number (CL1, CL2, or the like) for identifying the color and an RGB value (RGBcol1, RGBcol2, or the like) representing the color are associated with each other. Thumbnail data is RGB bitmap data which represents an image having a plurality of colors indicated by a color arrangement pattern corresponding to thumbnail data.

Figure 16:
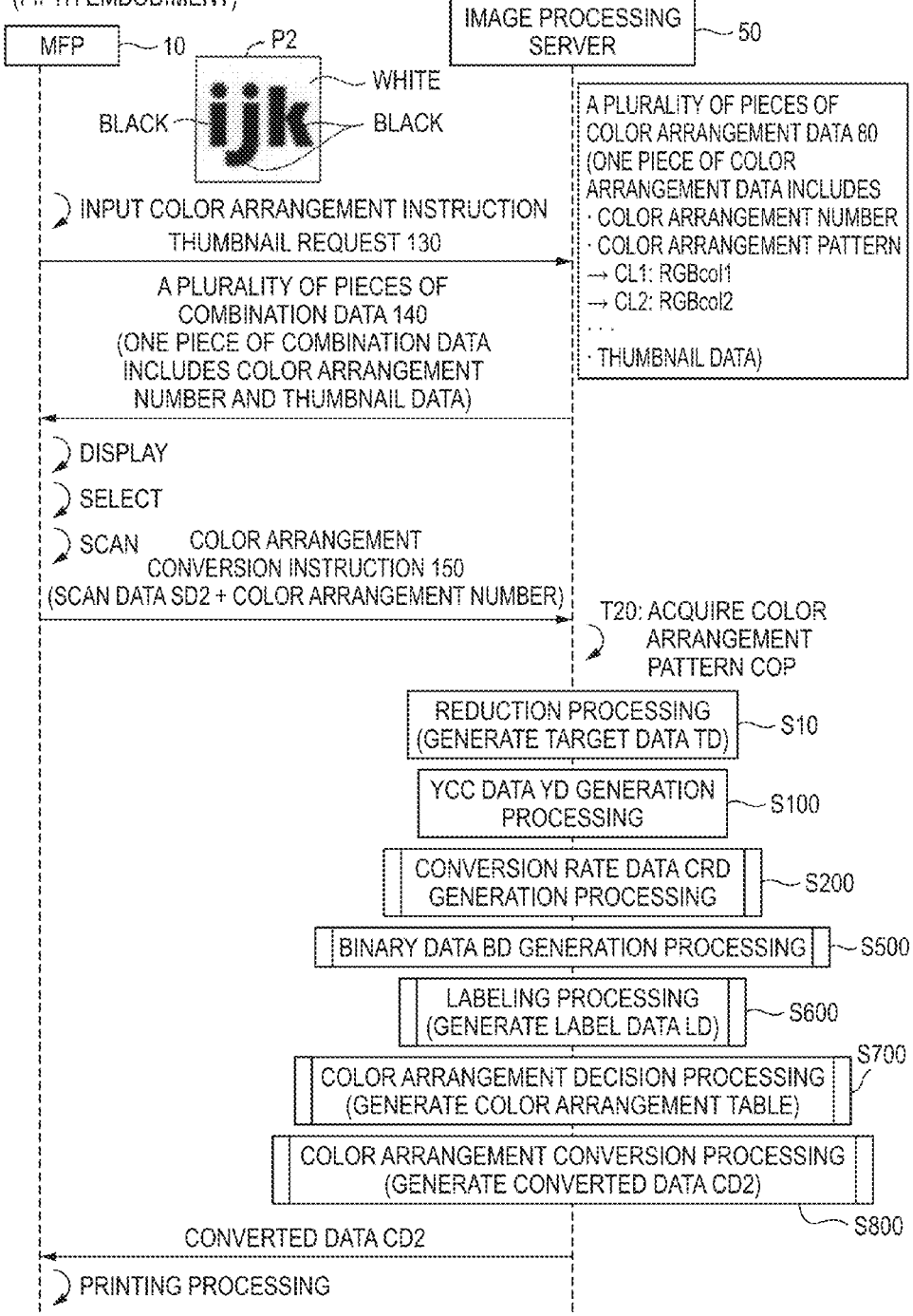
FIG. 16 is a sequence diagram of a fifth example.

(Processing which is Executed by MFP 10 and Image Processing Server 50; FIG. 16)

As in the first embodiment, the user of the MFP 10 first draws an object, such as a character or a figure, on a sheet P2 of A4 size in handwriting. In the embodiment of FIG. 16, black characters indicative of the letters "ijk" are drawn on the white sheet P2. Next, the user operates the operating unit 12 of the MFP 10 to input a color arrangement instruction to the MFP 10.

If the color arrangement instruction is input, the CPU 32 of the MFP 10 transmits a thumbnail request 130 for requesting the transmission of thumbnail data to the image processing server 50.

If the thumbnail request 130 is received from the MFP 10, for each of a plurality of pieces of color arrangement data 80, the CPU 62 of the image processing server 50 generates combination data in which the color arrangement number and thumbnail data included in the color arrangement data are associated with each other. As a result, the CPU 62 generates a plurality of pieces of combination data 140 from a plurality of pieces of color arrangement data 80. Then, the CPU 62 transmits a plurality of pieces of combination data 140 to the MFP 10.

If a plurality of pieces of combination data 140 are received from the image processing server 50, the CPU 32 of the MFP 10 displays a plurality of thumbnail images, which are represented by a plurality of pieces of thumbnail data included in a plurality of pieces of combination data 140, on the display unit 14.

FIG. 1 shows an example of thumbnail images SI3 and SI4 which are displayed in this embodiment. Each of the thumbnail images SI3 and SI4 includes three regions having three colors. The user operates operating unit 12 to select one thumbnail image while viewing the thumbnail images SI3 and SI4 displayed on the display unit 14.

As shown in FIG. 16, if one thumbnail image is selected by the user, the CPU 32 of the MFP 10 supplies an instruction to scan the sheet P2 to the scanning execution unit 22. With this, the scanning execution unit 22 executes color scanning of the sheet P2 of A4 size to generate scan data SD2 having the number of pixels (that is, K1 pixels) corresponding to A4 size.

Next, the CPU 32 of the MFP 10 acquires the color arrangement number which is associated with thumbnail data representing the selected thumbnail image among a plurality of pieces of combination data 140. Then, the CPU 32 transmits a color arrangement conversion instruction 150 including scan data SD2 and the acquired color arrangement number to the image processing server 50.

If the color arrangement conversion instruction 150 is received from the MFP 10, in T20, the CPU 62 of the image processing server 50 acquires one color arrangement pattern COP associated with the color arrangement number included in the color arrangement conversion instruction 150 among a plurality of color arrangement patterns included in a plurality of pieces of color arrangement data 80.

Next, as in the first embodiment, the CPU 62 of the image processing server 50 sequentially executes the reduction processing of S10, the YCC data generation processing of S100, and the conversion rate data generation processing of S200 to sequentially generate target data TD, YCC data YD, and conversion rate data CRD. As in the first embodiment, each of these pieces of data TD, YD, and CRD has the number of pixels (that is, K2 pixels) corresponding to postcard size.

Next, in S500, the CPU 62 of the image processing server 50 executes binary data generation processing. With this, the CPU 62 generates binary data BD which has K2 pixels. The binary data generation processing which is executed at this time is different from the binary data generation processing (FIG. 12) of the fourth embodiment.

Next, in S600, the CPU 62 of the image processing server 50 executes labeling processing using binary data BD. With this, the CPU 62 generates label data LD which has K2 pixels.

Next, in S700, the CPU 62 of the image processing server 50 executes color arrangement decision processing using label data LD and the color arrangement pattern COP. With this, the CPU 62 generates a color arrangement table.

Next, in S800, the CPU 62 of the image processing server 50 executes color arrangement conversion processing for target data TD using label data LD and the color arrangement table. With this, the CPU 62 generates converted data CD2 which has K2 pixels. Then, the CPU 62 transmits converted data CD2 to the MFP 10.

If converted data CD2 is received from the MFP 10, the CPU 32 of the MFP 10 supplies converted data CD2 to the printing execution unit 20. As a result, the printing execution unit 20 prints an image represented by converted data CD2 on a sheet of postcard size. With this, the printed sheet can be provided to the user.

Figure 17:
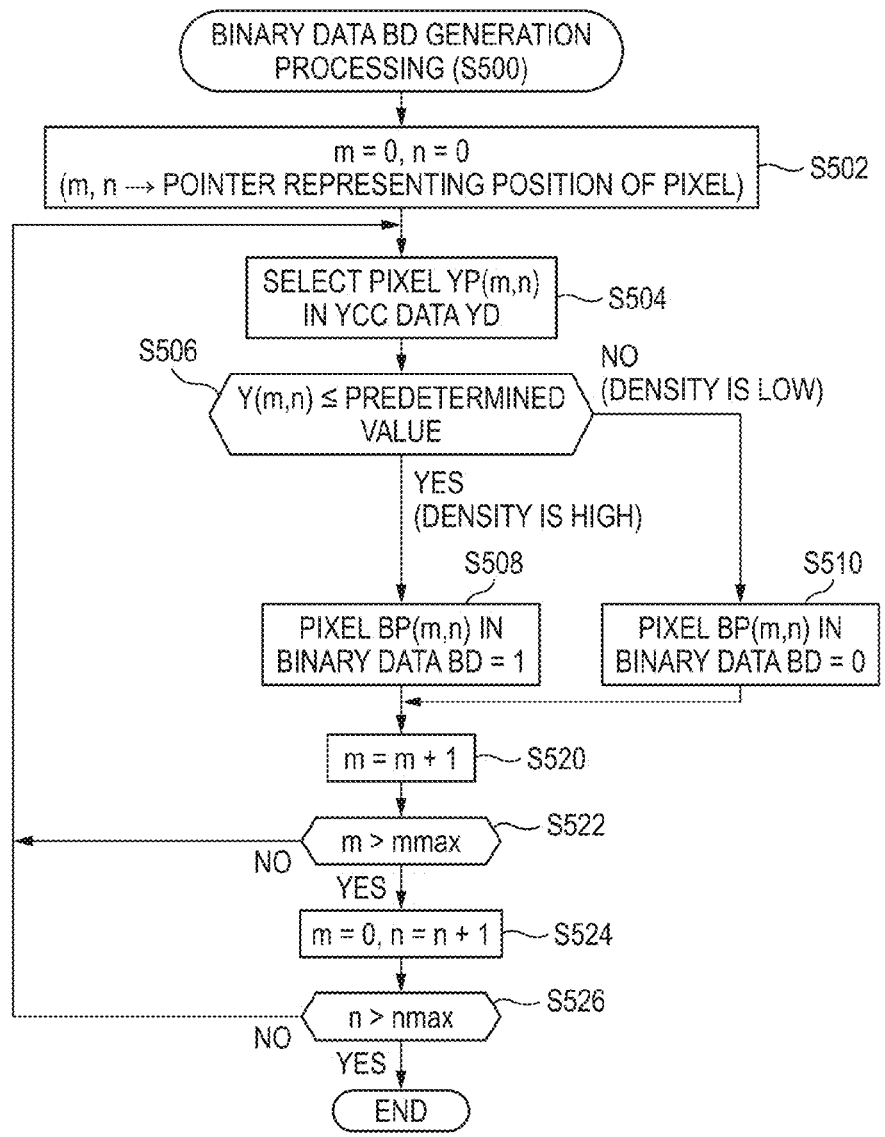
FIG. 17 is a flowchart of binary data generation processing of a fifth example.

(Binary Data Generation Processing; FIG. 17)

Subsequently, the details of the binary data generation processing of S500 of FIG. 16 will be described referring to FIG. 17. In S502, the CPU 62 of the image processing server 50 sets the value of each of the pointers m and n indicative of the position of the pixel to "0". In S504, the CPU 62 selects one pixel YP(m,n) in YCC data YD.

In S506, the CPU 62 performs determination about whether or not the luminance value Y(m,n) is equal to or less than a predetermined value. When the luminance value Y(m,n) is equal to or less than the predetermined value (YES in S506), this means that the density of the pixel TP(m,n) is comparatively high (that is, is equal to or higher than predetermined density). When the luminance value Y(m,n) is greater than the predetermined value (NO in S506), this means that the density of the pixel TP(m,n) is comparatively low (that is, is less than predetermined density). That is, in S506, the CPU 62 performs determination about whether or not the density of the pixel TP(m,n) is equal to or higher than predetermined density. Hereinafter, a pixel (that is, a pixel which is determined to be YES in S506) in target data TD which is determined to be equal to or higher than predetermined density is referred to as "object pixel".

When the luminance value Y(m,n) is equal to or less than the predetermined value (that is, YES in S506), in S508, the CPU 62 stores "1" as the pixel value of the pixel BP(m,n) in binary data BD. When it is determined that luminance value Y(m,n) is greater than the predetermined value (NO in S506), in S510, the CPU 62 stores "0" as the pixel value of the pixel BP(m,n) in binary data BD.

S520 to S526 are the same as S220 to S226 of FIG. 4. If it is determined to be YES in S526, the binary data generation processing ends. As a result, binary data BD is completed.

Figure 18:
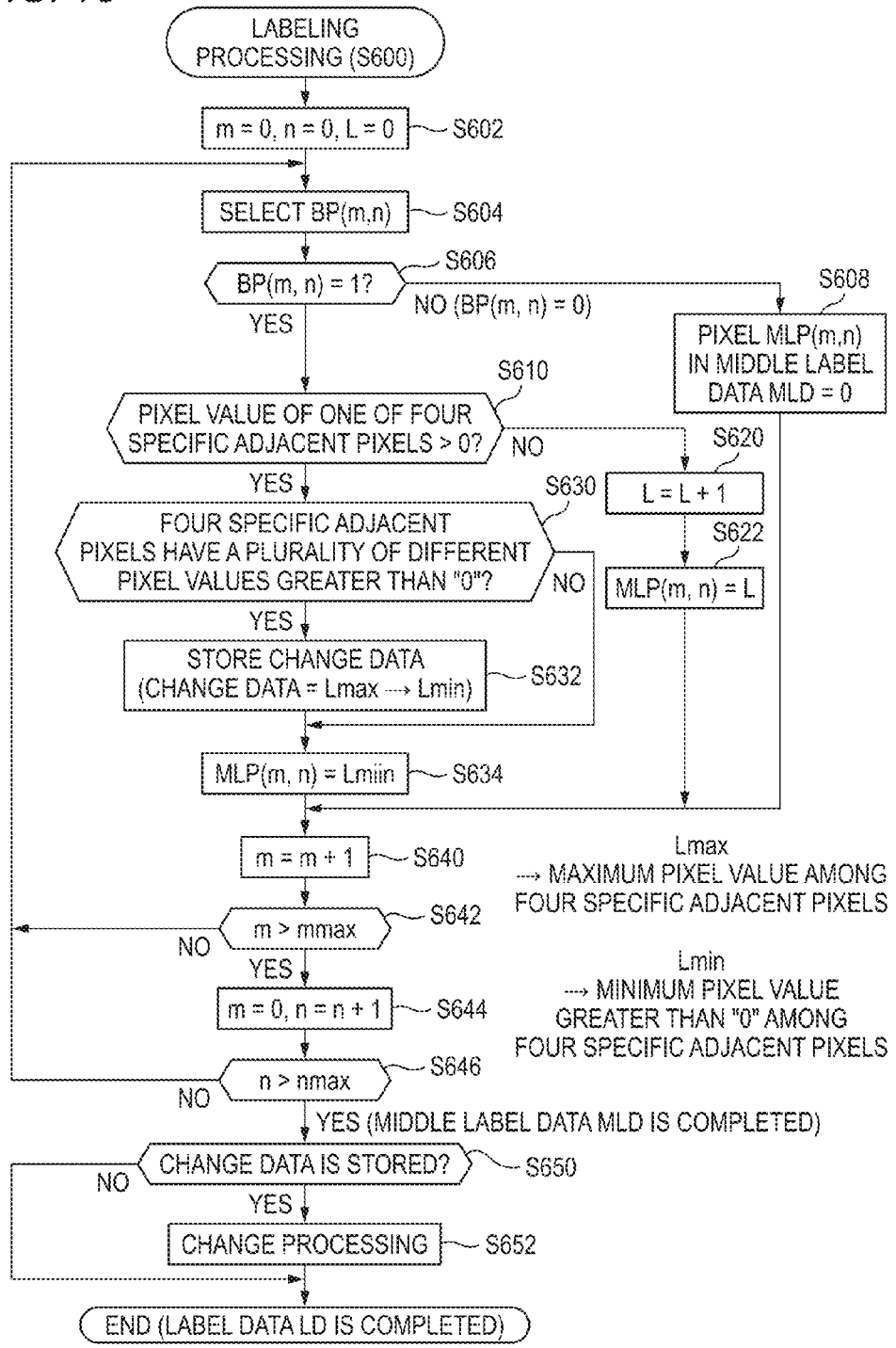
FIG. 18 is a flowchart of labeling processing.

(Labeling Processing; FIG. 18)

Subsequently, the details of the labeling processing of S600 of FIG. 16 will be described referring to FIG. 18. The labeling processing is executed to sort the object pixels in target data TD into a plurality of pixel groups. In the labeling processing, first, middle label data MLD is generated from binary data BD, and thereafter, label data LD is generated from middle label data MLD.

Figure 19:
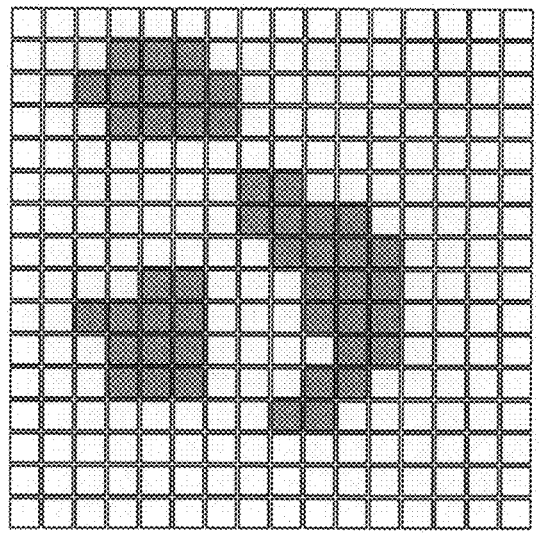
FIG. 19 shows target data and binary data.

Hereinafter, the details of the labeling processing will be described as to a case where target data TD and binary data BD shown in FIG. 19 are generated. One box in each of data TD and BD of FIG. 19 indicates one pixel. In target data TD, a box which is colored with gray indicates a pixel (that is, an object pixel) which has density equal to or higher than a predetermined density, and a white box indicates a pixel which has density lower than a predetermined density. In binary data BD, the pixel value (that is, "1" or "0") according to the density of each pixel in target data TD is described.

In S602 of FIG. 18, the CPU 62 of the image processing server 50 sets the value of each of the points m and n indicative of the position of the pixel to "0", and sets the value of a pointer L to "0". In S604, the CPU 62 selects one pixel BP(m,n) included in binary data BD. Then, in S606, the CPU 62 performs determination about whether or not the pixel value of the pixel BP(m,n) is "1".

When it is determined that the pixel value of the pixel BP(m,n) is "0" (that is, NO in S606), in S608, the CPU 62 stores "0" as the pixel value of a pixel MLP(m,n) in middle label data MLD. If S608 ends, the process progresses to S640.

Figure 20:
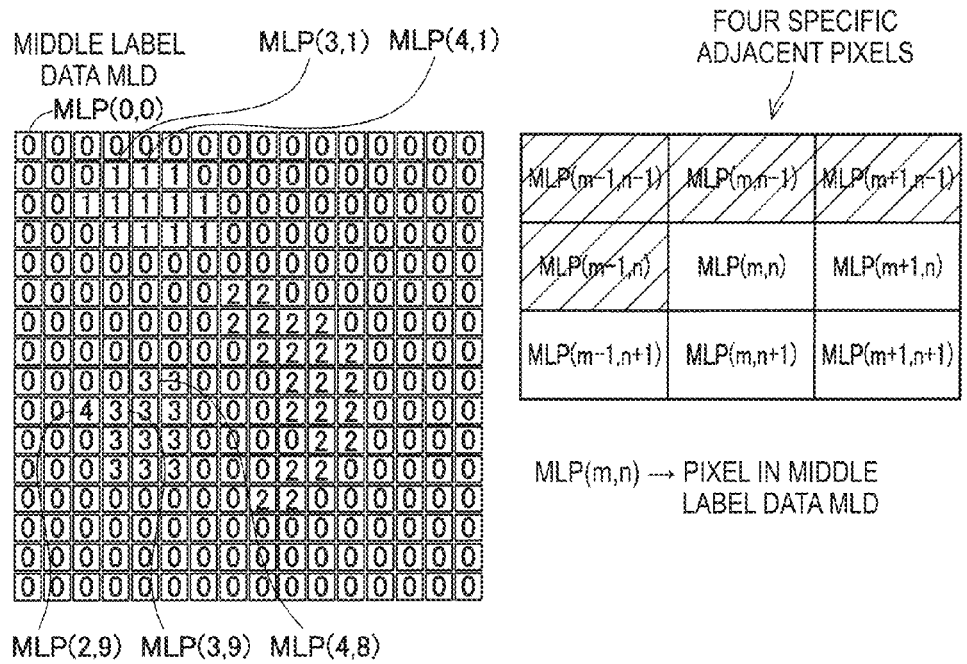
FIG. 20 shows middle label data and label data.

FIG. 20 shows an example of middle label data MLD. For example, in binary data BD of FIG. 19, the pixel value of a pixel BP(0,0) is "0". Accordingly, when the pixel BP(0,0) is selected in S604 of FIG. 18, the CPU 62 determines to be NO in S606, and stores "0" as the pixel value of a pixel MLP(0,0) in middle label data MLD in S608.

In S606 of FIG. 18, when it is determined that the pixel value of the pixel BP(m,n) is "1" (YES in S606), in S610, the CPU 62 performs determination about whether or not the pixel value of one of four specific adjacent pixels is greater than "0".

The four specific adjacent pixels will be described referring to FIG. 20. In a stage in which the pixel value of the pixel MLP(m,n) in middle label data MLD should be decided, the pixel value of each of four pixels (that is, four hatched pixels) among eight pixels adjacent to the pixel MLP(m,n) is already decided. The four pixels in which the pixel value is already decided are the four specific adjacent pixels.

In S610 of FIG. 18, when it is determined that the pixel values of all of the four specific adjacent pixels are "0" (NO in S610), in S620, the CPU 62 adds "1" to the current value of the pointer L to set a new value of the pointer L. Then, in S622, the CPU 62 stores the value of the pointer L as the pixel value of the pixel MLP(m,n) in middle label data MLD. If S622 ends, the process progresses to S640.

For example, in a stage in which the pixel value of a pixel MLP(3,1) in middle label data MLD of FIG. 20 should be decided, the pixel values of all of the four specific adjacent pixels are "0", and the value of the pointer L is "0". Accordingly, when the pixel BP(3,1) is selected in S604 of FIG. 18, the CPU 62 determines to be NO in S610, sets "1" as the value of the pointer L in S620, and stores "1" as the pixel value of the pixel MLP(3,1) in S622.

For example, in a stage in which the pixel value of a pixel MLP(2,9) in middle label data MLD of FIG. 20 should be decided, the pixel values of all of the four specific adjacent pixels are "0", and the value of the pointer L is "3". Accordingly, when the pixel BP(2,9) is selected in S604 of FIG. 18, the CPU 62 determines to be NO in S610, sets "4" as the value of the pointer L in S620, and stores "4" as the pixel value of the pixel MLP(2,9) in S622.

In S610 of FIG. 18, when it is determined that the pixel value of one of the four specific adjacent pixels is greater than "0" (YES in S610), in S630, the CPU 62 performs determination about whether or not the four specific adjacent pixels have a plurality of different pixel values greater than "0".

When it is determined that the four specific adjacent pixels have a plurality of different pixel values greater than "0" (YES in S630), in S632, the CPU 62 stores change data. Change data is data which indicates that a maximum pixel value Lmax greater than "0" among the four pixel values of the four specific adjacent pixels should be changed to a minimum pixel value Lmin greater than "0".

Next, in S634, the CPU 62 stores the minimum value Lmin greater than "0" among the four pixel values of the four specific adjacent pixels as the pixel value of the pixel MLP(m,n) in middle label data MLD. If S634 ends, the process progresses to S640.

For example, in a state in which the pixel value of a pixel MLP(3,9) in middle label data MLD of FIG. 20 should be decided, the pixel value of a specific adjacent pixel MLP(4,8) is "3", the pixel value of a specific adjacent pixel MLP(2,9) is "4", and the pixel values of the other two specific adjacent pixels are "0". Accordingly, when a pixel BP(3,9) is selected in S604 of FIG. 18, the CPU 62 determines to be YES in S610 and determines to be YES in S630. Then, in S632, the CPU 62 stores change data which indicates that the maximum pixel value "4 (that is, Lmax)" greater than "0" among the four pixel values of the four specific adjacent pixels should be changed to the minimum pixel value "3 (that is, Lmin)" greater than "0". Next, in S634, the CPU 62 stores the minimum pixel value "3"

greater than "0" among the four pixel values of the four specific adjacent pixels as the pixel value of the pixel MLP(3,9).

In S630 of FIG. 18, when it is determined that the four specific adjacent pixels do not have a plurality of different pixels values greater than "0" (NO in S630), the CPU 62 skips S632, and stores the pixel value Lmin as the pixel value of the pixel MLP(m,n) in middle label data MLD in S634.

For example, in a stage in which the pixel value of a pixel MLP(4,1) in middle label data MLD of FIG. 20 should be decided, the pixel value of the specific adjacent pixel MLP (3,1) is "1", and the pixel values of the other three specific adjacent pixels MLP are "0". Accordingly, when the pixel BP(4,1) is selected in S604 of FIG. 18, the CPU 62 determines to be NO in S630, and stores the minimum pixel value "1" greater than "0" among the four pixel values of the four specific adjacent pixels as the pixel value of the pixel MLP(4,1) in S634.

S640 to S646 are the same as S220 to S226 of FIG. 4. If it is determined to be YES in S646, middle label data MLD is completed. In this case, in S650, the CPU 62 performs determination about whether or not change data is stored in S632.

When it is determined that change data is stored in S632 (YES in S650), in S652, the CPU 62 executes change processing for changing middle label data MLD according to change data to generate label data LD. For example, when change data which indicates that the pixel value "4" should be changed to the pixel value "3" is stored, the CPU 62 changes the pixel value "4" of the pixel MLP(2,9) in middle label data MLD of FIG. 20 to the pixel value "3". With this, label data LD which includes a pixel LP(2,9) having the pixel value "3" after change is generated (see label data LD of FIG. 20). If S652 ends, the labeling processing ends.

When it is determined that change data is not stored in S632 (NO in S650), the CPU 62 skips S652 and ends the labeling processing. In this case, label data LD which coincides with middle label data MLD is completed.

If the labeling processing ends, the object pixels in target data TD are sorted into a plurality of pixel groups. One pixel group has object pixels which are at the positions corresponding to the pixels in label data LD having the same pixel value. Hereinafter, each pixel group is referred to as "a pixel group corresponding to a pixel value L (for example, pixel value "1") using the pixel value L (for example, pixel value "1") in label data LD.

Figure 21:
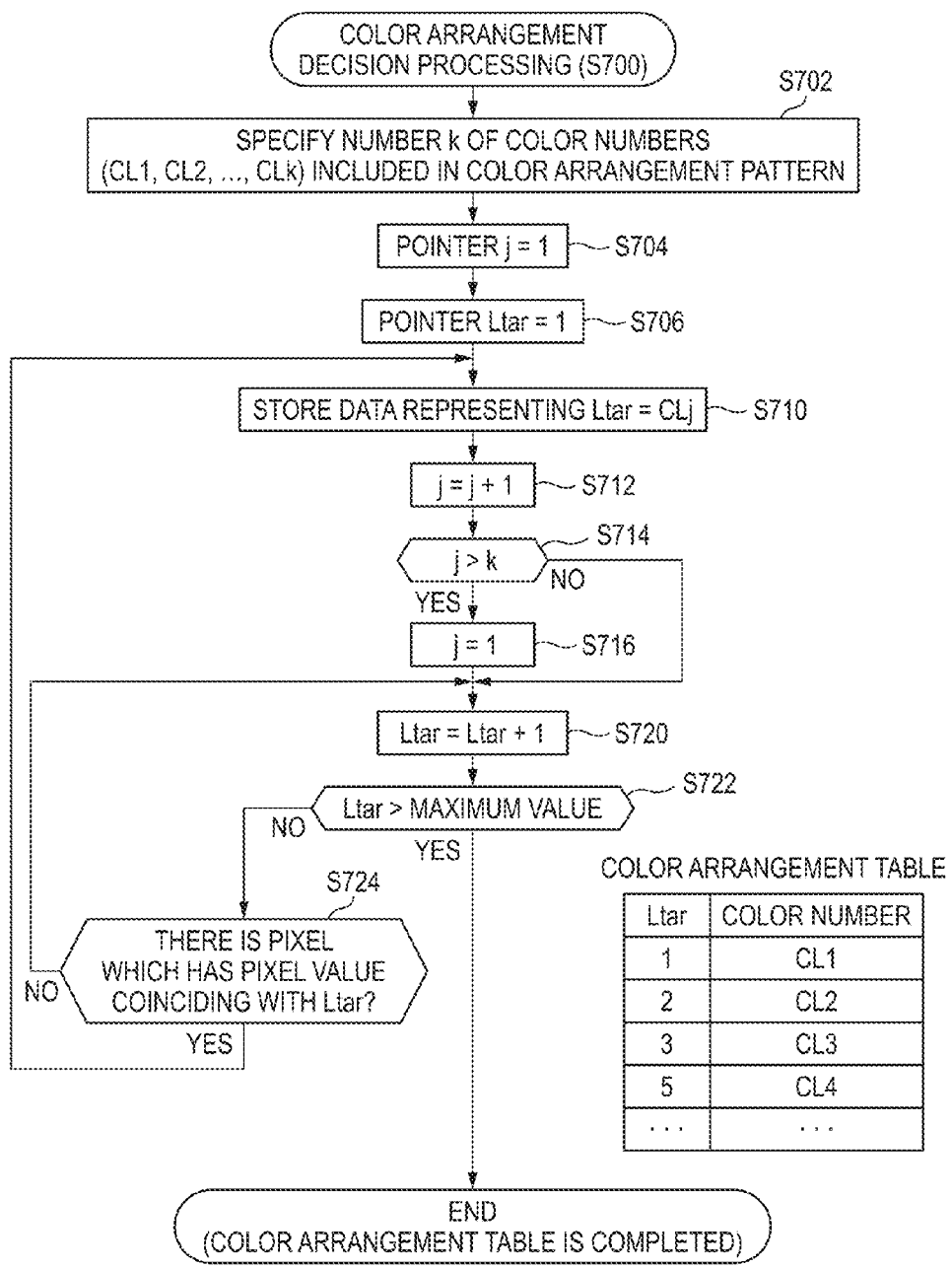
FIG. 21 is a flowchart of color arrangement decision processing.

(Color Arrangement Decision Processing; FIG. 21)

Subsequently, the details of the color arrangement decision processing of S700 of FIG. 16 will be described referring to FIG. 21. In S702, the CPU 62 of the image processing server 50 specifies the number k of color number (that is, CL1, CL2, . . . , CLk) included in the color arrangement pattern COP acquired in T20 of FIG. 16. Next, in S704, the CPU 62 sets "1" as the value of a pointer j. Then, in S706, the CPU 62 sets "1" as the value of the pointer Ltar.

In S710, the CPU 62 described information (for example, information in which "Ltar=1" and "CL1" are associated with each other), in which the value of the pointer Ltar and the color number CLj are associated with each other, in the color arrangement table. With this, the CPU 62 selects a conversion color (that is, a color corresponding to the color number CLj) for a pixel group corresponding to the value of the pointer Ltar.

Next, in S712, the CPU 62 adds "1" to the current value of the pointer j to set a new value of the pointer j. Then, in S714, the CPU 62 performs determination about whether or not the value of the pointer j is greater than k.

In S714, when it is determined that the value of the pointer j is greater than k (YES in S714), in S716, the CPU 62 sets the value of the pointer j to "1". If S716 ends, the process progresses to S720. In S714, when it is determined that the value of the pointer j is equal to or less than k (NO in S714), the CPU 62 skips S716 and progresses to S720.

In S720, the CPU 62 adds "1" to the current value of the pointer Ltar to set a new value of the pointer Ltar. Then, in S722, the CPU 62 performs determination about whether or not the value of the pointer Ltar is greater than the maximum pixel value included in label data LD.

In S722, when it is determined that the value of the pointer Ltar is equal to or less than the maximum pixel value (NO in S722), in S724, the CPU 62 determines whether or not there is a pixel, which has a pixel value coinciding with the value of the pointer Ltar, in label data LD. When it is determined that there is a pixel, which has a pixel value coinciding with the value of the pointer Ltar, in label data LD (YES in S724), the CPU 62 returns to S710.

In S724, when it is determined that there is no pixel, which has a pixel value coinciding with the value of the pointer Ltar, in label data LD (NO in S724), the CPU 62 returns to S720. For example, in S632 of FIG. 18, when change data which indicates that the pixel value "4" should be changed to the pixel value "3" is stored, in S652, label data LD in which the pixel value "4" is changed to the pixel value "3" is generated, and thus, there is no pixel, which has the pixel value "4", in label data LD. In this case, in S724 of FIG. 21, the CPU 62 determines that there is no pixel, which has a pixel value coinciding with the value "4" of the pointer Ltar, in label data LD (NO in S724).

In S722, when it is determined that the value of the pointer Ltar is greater than the maximum pixel value (YES in S722), the CPU 62 ends the color arrangement decision processing. With this, the color arrangement table is completed.

Figure 22:
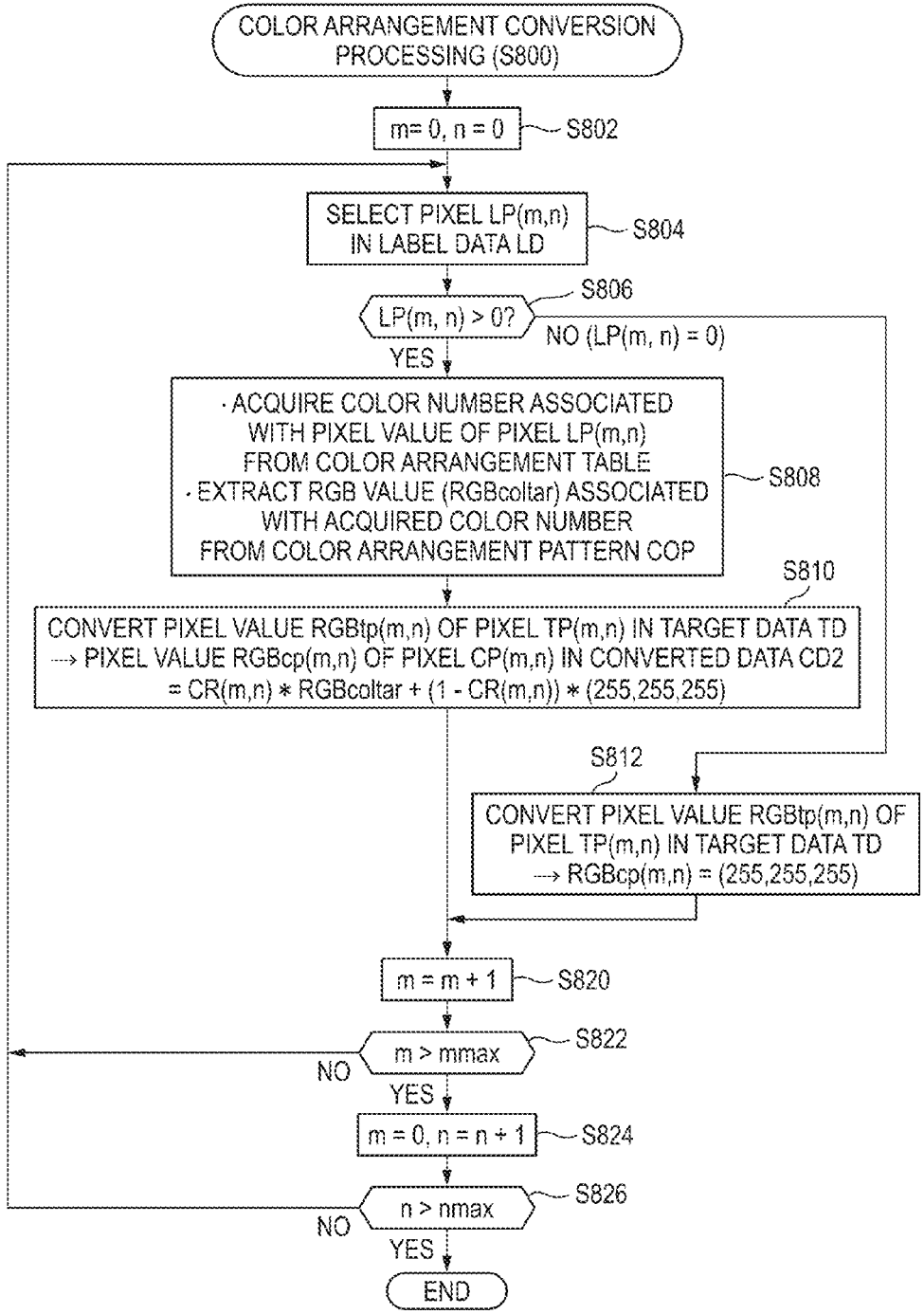
FIG. 22 is a flowchart of color arrangement conversion processing.

(Color Arrangement Conversion Processing; FIG. 22)

Subsequently, the details of the color arrangement conversion processing of S800 of FIG. 16 will be described referring to FIG. 22. In S802, the CPU 62 of the image processing server 50 sets the value of each of the pointers m and n indicative of the position of the pixel to "0". In S804, the CPU 62 selects one pixel LP(m,n) in label data LD. In S806, the CPU 62 determines whether or not the pixel value of the pixel LP(m,n) is greater than "0". That is, the CPU 62 determines whether or not the pixel TP(m,n) is an object pixel.

In S806, when it is determined that the pixel value of the pixel LP(m,n) is greater than "0" (YES in S806), in S808, the CPU 62 acquires the color number, with which a value coinciding with the pixel value of the pixel LP(m,n) is associated, from the color arrangement table generated in the color arrangement decision processing of FIG. 21. Next, the CPU 62 acquires the RGB value, which is associated with the acquired color number, from the color arrangement pattern COP acquired in T20 of FIG. 16. Hereinafter, the RGB value acquired at this time is described as "RGBcoltar".

Next, in S810, the CPU 62 converts the pixel value of the pixel TP(m,n) in target data TD using the conversion rate CR(m,n) in conversion rate data CRD and RGBcoltar. Specifically, the CPU 62 calculates RGBcp(m,n) according to a numerical expression in S810 and converts the pixel value of the pixel TP(m,n) to the calculated RGBcp(m,n). If S810 ends, the process progresses to S820.

In S806, when it is determined that the pixel value of the pixel BP(m,n) is "0" (YES in S806), in S812, the CPU 62 converts the pixel value of the pixel TP(m,n) in target data TD to the RGB value (255,255,255) indicative of white. If S812 ends, the process progresses to S820.

S820 to S826 are the same as S220 to S226 of FIG. 4. If it is determined to be YES in S826, the color arrangement conversion processing ends. With this, converted data CD2 in which each color indicated by the color arrangement pattern COP is arranged in each pixel group in target data TD is completed.

(Example of Pixel Value Conversion)

Figure 23:
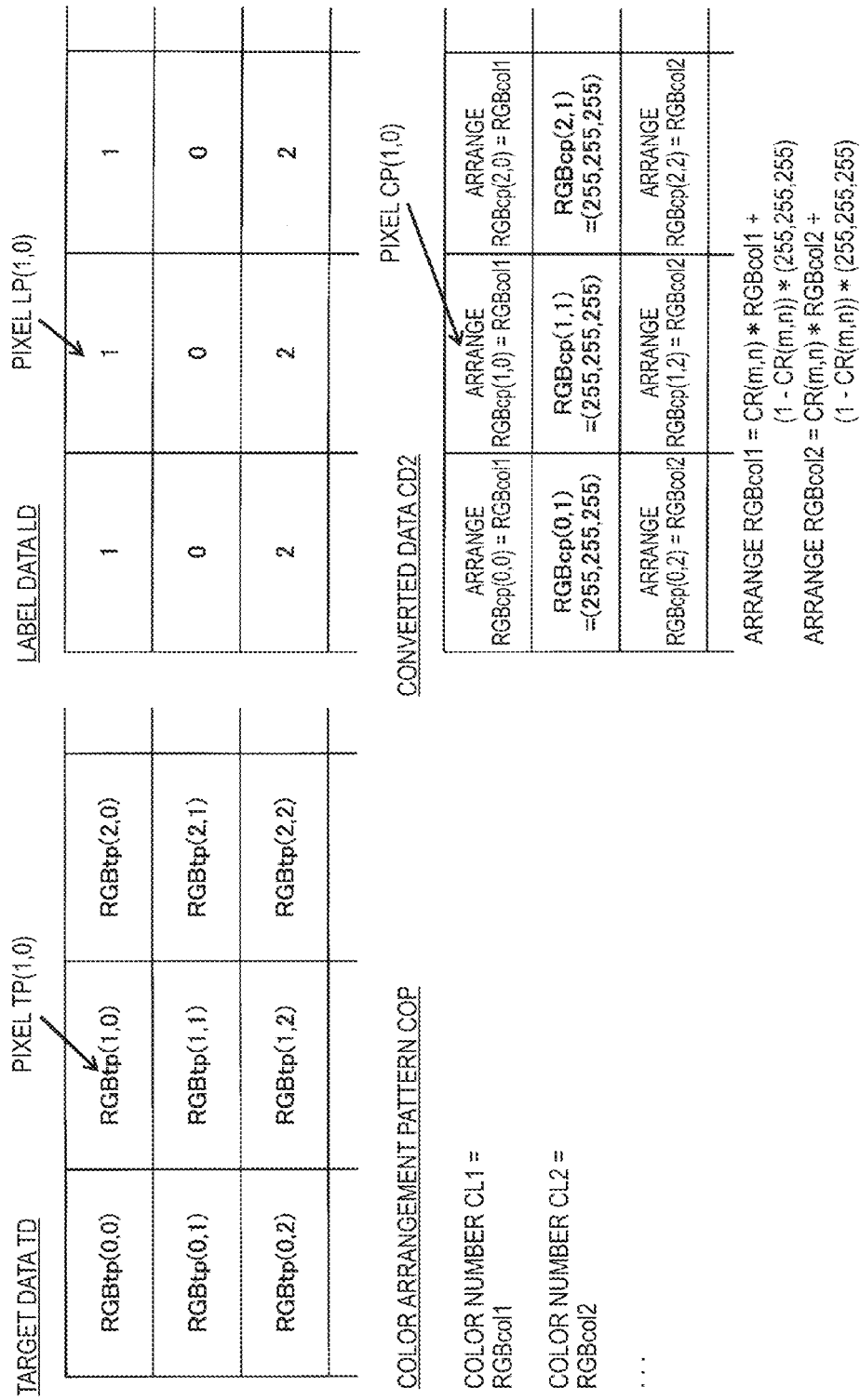
FIG. 23 shows target data, label data, and converted data.

FIG. 23 shows an example of target data TD, label data LD, the color arrangement pattern COP, and converted data CD2. A pixel LP(0,0) in label data LD has a pixel value "1". Accordingly, when the pixel LP(0,0) is selected in S804 of FIG. 22, the CPU 62 determines to be YES in S806, acquires the color number "CL1" associated with the value "1" from the color arrangement table (see FIG. 21) in S808, and extracts RGBcol1, which is the RGB value associated with the color number "CL1", from the color arrangement pattern COP. Next, in S810, the CPU 62 calculates RGBcp(0,0) using CR(0,0) and RGBcol1. The smaller CR(0,0), the closer RGBcp(0,0) to the RGB value (255,255,255) indicative of the color of the background image, and the larger CR(0,0), the closer RGBcp(0,0) to RGBcol1.

Similarly to the pixel LP(0,0), each of a pixel LP(1,0) and a pixel LP(2,0) has a pixel value "1". Accordingly, each of a pixel TP(1,0) and a pixel TP(2,0) is converted using RGBcol1. That is, the color corresponding to the color number CL1 is arranged for a pixel group (that is, the pixel TP(0,0), the pixel TP(1,0), and the pixel TP(2,0)) corresponding to the pixel value "1".

Each of a pixel LP(0,2), a pixel LP(1,2), and a pixel LP(2,2) has a pixel value "2". In this case, the color number "CL2" associated with the value "2" is acquired from the color arrangement table (see FIG. 21), and RGBcol2 which is the RGB value associated with the color number "CL2" is extracted from the color arrangement pattern COP. Accordingly, each of a pixel TP(0,2), a pixel TP(1,2), and a pixel TP(2,2) is converted using RGBcol2. That is, the color corresponding to a color number CL2 is arranged for the pixel group (that is, the pixel TP(0,2), the pixel TP(1,2), and the pixel TP(2,2)) corresponding to the pixel value "2".

Figure 24A:
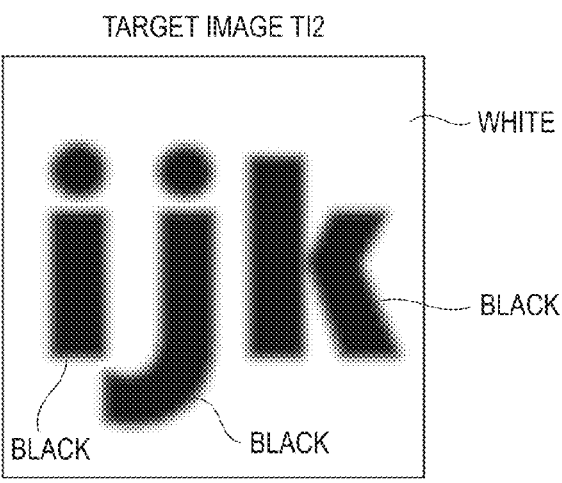
FIGS. 24A to 24C show a situation in which a target image is converted.
Figure 24B:
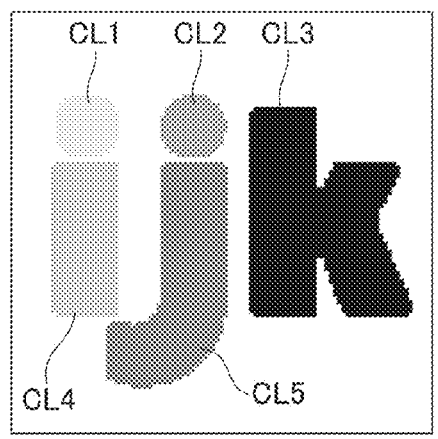
Figure 24C:
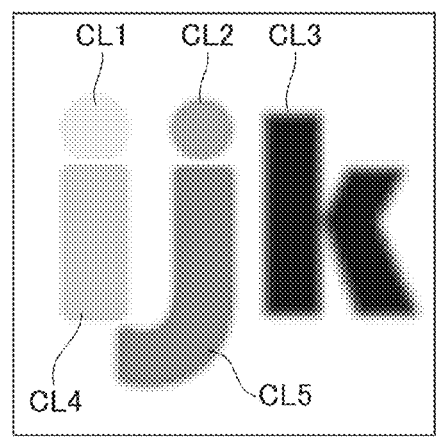

(Example of Image Conversion; FIGS. 24A to 24C)

FIG. 24A shows an example of a target image TI2 of this embodiment. The target image TI2 includes a white background image, and five object images indicative of black characters "ijk". One object image means an image in which black is continued. Accordingly, each of an upper portion and a lower portion of the character "i" corresponds to one object image. Similarly, each of an upper portion and a lower portion of the character "j" corresponds to one object image. Since the characters "ijk" are drawn with, for example, a pen, the density is gradually lowered from the central portion of a line forming each character toward the edge portion of the line.

In the binary data generation processing of S500 of FIG. 16, the image processing server 50 determines that respective pixels, which represent respective object images indicative of the characters "ijk", among a plurality of pixels included in target data TD are object pixels (YES in S506 of FIG. 17).

In the labeling processing of S600 of FIG. 16, the image processing server 50 sorts the object pixels in target data TD into five pixel groups (see FIG. 18). That is, the image processing server 50 performs sorting into five pixel groups representing five object images.

In the color arrangement decision processing of S700 of FIG. 16, the image processing server 50 selects a color corresponding to each of the color numbers CL1 to CL5 as each conversion color for each pixel group in target data TD (see S710 of FIG. 21).

In the color arrangement conversion processing of S800 of FIG. 16, for each of the pixel groups in target data TD, the image processing server 50 converts the pixel value of each of all object pixels forming the pixel group using a value (that is, RGBcoltar) indicative of the selected color (S808 and S810 of FIG. 22).

In a comparative example, the image processing server 50 converts the pixel value of a high density pixel TP(m,n) in target data TD to a value coinciding to RGBcoltar regardless of the conversion rate CR(m,n). The image processing server 50 converts the pixel value of a low density pixel TP(m,n) in target data TD to the RGB value (255,255,255) indicative of the predetermined color (that is, white) of the background image regardless of the conversion rate CR(m,n).

FIG. 24B shows an image CI0" which is represented by converted data CD2 generated by a method of the comparative example. In the mage CI0" of the comparative example, five converted object images (that is, the characters "ijk") represent five colors corresponding to the color numbers CL1 to CL5 included in the color arrangement pattern COP. In the edge portion of each of the five converted object images, the density does not change smoothly.

In contrast, in this embodiment, for each of a plurality of pixels in target data TD, the image processing server 50 converts the pixel value of the pixel according to the conversion rate (see S800 of FIG. 16 and FIG. 22). As a result, the image processing server 50 can generate converted data CD2 representing a converted image CI2 shown in FIG. 24C.

In each converted object image (that is, the characters "ijk") in the converted image CI2, each color corresponding to each of the color numbers CL1 to CL5 becomes lighter (that is, becomes close to white) from the central portion of a line forming each character toward the edge portion of the line. In this way, according to the method of this embodiment, it is possible to provide the user with an appropriate converted image CI2 in which the density of each region in the target image TI2 is reflected.

The converted image CI2 includes the five converted object images which have the shapes corresponding to the objects "ijk" drawn by the user and in which a plurality of different colors are arranged. In this embodiment, it is also possible to provide the user with a sheet on which an interesting converted image CI2 is printed.

(Correspondence Relationship)

In target data TD representing the target image TI2 of FIG. 24A, the five pixel groups are an example of "N pixel groups". The processing of S500, the processing of S600, the processing of S700, and the processing of S800 of FIG. 16 are respectively examples of processing to be executed by "determination unit", "sorting unit", "selection unit", and "conversion unit". In FIG. 16, the processing for transmitting converted data CD2 to the MFP 10 is an example of processing to be executed by "output unit".

Sixth Embodiment

FIG. 25

In this embodiment, the image processing server 50 changes whether to transmit converted data CD1 to the MFP 10 or to transmit confirmation data CD1' to the MFP 10 according to an instruction received from the MFP 10.

Each kind of processing until a plurality of thumbnail images SI1 and SI2 are displayed on the display unit 14 of the MFP 10 is the same as in the first embodiment (see FIG. 2). After selecting one thumbnail image among a plurality of thumbnail images SI1 and SI2, the user can operate the operating unit 12 of the MFP 10 to select whether to print a converted image on a sheet of postcard size or to print the converted image on a sheet of A4 size to conform the content of the converted image.

When a sheet of postcard size is selected, as in FIG. 2 of the first embodiment, the subsequent processing is executed. That is, the CPU 32 of the MFP 10 transmits the synthesis conversion instruction 120 to the image processing server 50. Then, if the synthesis conversion instruction 120 is received from the MFP 10, the CPU 62 of the image processing server 50 transmits converted data CD1 having the number of pixels corresponding to postcard size to the MFP 10. With this, the MFP 10 prints the converted image on the sheet of postcard size.

On the other hand, when a sheet of A4 size is selected (that is, when printing for confirmation is selected), as shown in FIG. 25, the CPU 32 of the MFP 10 transmits a confirmation instruction 122 including scan data SD1 and the reference number corresponding to the selected thumbnail image to the image processing server 50.

If the confirmation instruction 122 is received from the MFP 10, as in the first embodiment, the CPU 62 of the image processing server 50 sequentially executes the reduction processing of S10, the YCC data generation processing of S100, the conversion rate data generation processing of S200, and the synthesis conversion processing of S300 to generate converted data CD1.

Next, in S900, the CPU 62 of the image processing server 50 writes converted data CD1 at a predetermined position in template data stored in advance in the memory 64 to generate confirmation data CD1'. Template data has the number of pixels corresponding to A4 size, and includes data which represents a message indicative of printing confirmation. Then, the CPU 62 transmits confirmation data CD1' to the MFP 10.

If confirmation data CD1' is received from the image processing server 50, the CPU 32 of the MFP 10 supplies confirmation data CD1' to the printing execution unit 20. As a result, the printing execution unit 20 prints an image represented by confirmation data CD1' on the sheet of A4 size. With this, the user views the printed sheet, thereby confirming the content of the converted image.

FIG. 25 shows an example of a sheet P3 of A4 size on which an image represented by confirmation data CD1' is printed. A converted image is printed in the central portion of the sheet P3, and a message indicative of printing confirmation is printed below the portion. In this way, in this embodiment, the converted image is not printed over the entire region of the sheet P3 of A4 size, and the converted image is printed in a portion of the sheet P3.

The technique of this embodiment can be applied to the second embodiment to the fifth embodiment, as well as the first embodiment. For embodiment, in the fifth embodiment, when selecting a thumbnail image, the user may select printing for confirmation (see "select" of FIG. 16). In this case, the CPU 62 of the image processing server 50 receives a confirmation instruction including scan data SD2 and the color arrangement number from the MFP 10. In this case, the CPU 62 generates converted data CD2 and then writes converted data CD2 at a predetermined position in template data to generate confirmation data as in the sixth embodiment. Then, the CPU 62 transmits confirmation data to the MFP 10. With this, the MFP 10 prints an image represented by confirmation data on a sheet of A4 size.

(Correspondence Relationship)

A4 size and postcard size are respectively examples of "first medium size" and "second medium size". The confirmation instruction 122 and the synthesis conversion instruction 120 are respectively examples of "first instruction" and "second instruction". Scan data SD1 and confirmation data CD1' are respectively examples of "original data" and "output data". The processing of S900 is an example of processing to be executed by "generation unit".

Although the specific embodiment of the invention has been described in detail, this is just for illustration and is not intended to limit the scope of the appended claims. The techniques described in the claims include various modifications and alterations of the above-described specific embodiment. Modification embodiments of the above-described embodiment will be described below.

Modification Embodiment 1

For example, the MFP 10 may store a plurality of pieces of synthesis data 70 or a plurality of pieces of color arrangement data 80. Then, the MFP 10 may execute each kind of processing of each embodiment (for example, T10, S10, and S100 to S300 of FIG. 2), instead of the image processing server 50. In this case, the MFP 10 can execute printing using converted data CD1 generated by the MFP 10. In this modification embodiment, the MFP 10 is an example of "image processing apparatus".

Modification Embodiment 2

For example, a driver program for the MFP 10 may include a plurality of pieces of synthesis data 70 or a plurality of pieces of color arrangement data 80. In this case, a PC on which the driver program is installed may execute each kind of processing of each embodiment, instead of the image processing server 50. In this modification embodiment, the PC is an example of "image processing apparatus".

Modification Embodiment 3

In the above-described embodiments, scanning of the sheet P1 (see FIG. 2) of "A4 size" is executed, and printing is executed on the sheet of "postcard size". Alternatively, scanning of a sheet of different size (for example, postcard size, B4 size, B5 size, legal size, or the like) may be executed. Printing may be executed on a sheet of different size (for example, A4 size, B4 size, or the like).

Modification Embodiment 4

The image processing server 50 may execute the YCC data generation processing of S100 and the conversion rate data generation processing of S200 for scan data SD1 having a first number of pixels corresponding to, for example, A4 size, without executing the reduction processing of S10 of FIG. 2, and may execute the synthesis conversion processing of S300 using reference data RD having the first number of pixels. In this case, converted data CD1 having the first number of pixels is generated. Then, the image processing server 50 may execute reduction processing for converted data CD1 to generate reduced data having a second umber of pixels corresponding to, for example, postcard size, and may transmit reduced data to the MFP 10. In this case, the MFP 10 can also print a converted image on the sheet of postcard size. In this modification embodiment, scan data SD1 and reduced data are respectively examples of "target data" and "converted data".

Modification Embodiment 5

In the above-described embodiments, the image processing server 50 transmits converted data CD1 to the MFP 10 to make the MFP 10 print the converted image CI1. Alternatively, for example, the image processing server 50 may transmit converted data CD1 to a display device to make the display device display the converted image CI1. That is, "converted data" may not be data for printing or may be data for display.

Modification Embodiment 6

"Target data" may not be data which is obtained from scan data or may be, for example, data which represents an image captured by a digital camera or data which represents an image drawn by drawing software. That is, "target data" may be data which represents a target image to be converted.

Modification Embodiment 7

In the above-described embodiments, the image processing server 50 generates YCC data YD from target data TD (see S100 of FIG. 2), and generates conversion rate data CRD using the luminance value Y(m,n) in YCC data YD (see S200). Alternatively, the image processing server 50 may generate data which is represented by a predetermined color space (for example, Lab color space), instead of YCC data YD, and may generate conversion rate data CRD using a value (for example, L value) in data. In this modification embodiment, the value of the predetermined color space is an example of "density relation value".

Modification Embodiment 8

In the above-described embodiments, as shown in FIG. 8, the image processing server 50 converts the pixel value of pixel TP(m,n) in target data TD such that RGBcp(m,n) changes linearly with CR(m,n). Alternatively, the image processing server 50 may convert the pixel value of the pixel TP(m,n) in target data TD such that RGBcp(m,n) changes nonlinearly with CR(m,n). In general, a "conversion unit" may convert the pixel value of a object pixel such that, the higher the density indicative of the density relation value of the object pixel, the closer the pixel value of a converted pixel to a value indicative of a conversion color for the object pixel.

Modification Embodiment 9

The techniques of the above-described embodiments can be used in various combinations. For example, the technique (see S301A, S301B, and S308-3 of FIG. 10) of the third embodiment which uses RGBbg indicative of the color of the background image and the technique (see S206 of FIG. 4) of the second embodiment which uses the difference between the maximum luminance value Ymax and the minimum luminance value Ymin may be used in combination. The technique (see S305 of FIG. 14) of the fourth embodiment which changes processing with an achromatic color or a chromatic color and the technique of at least one of the second and third embodiments may be used in combination. The technique (see FIG. 16) of the fifth embodiment which executes the color arrangement conversion processing and the technique of at least one of the second to fourth embodiments may be used in combination.

For example, when the technique of the fifth embodiment and the technique of the fourth embodiment are combined, the following processing may be executed. That is, when it is determined to be YES in S806 of FIG. 22, the image processing server 50 executes the same determination processing as in S404 of FIG. 12 using the first color difference value Cr(m,n) and the second color difference value Cb(m,n) of the pixel YP(m,n) in YCC data YD. Then, when it is determined in the determination processing that the pixel has the color within the predetermined achromatic color range, the image processing server 50 executes the processing of S808 and S810 of FIG. 22 to convert the pixel value of the pixel TP(m,n) in target data TD. When it is determined in the determination processing that the pixel has the color within the predetermined chromatic color range, the image processing server 50 does not convert the pixel value of the pixel TP(m,n) in target data TD.

Modification Embodiment 10

In the above-described embodiments, the CPU 62 of the image processing server 50 executes the program in the memory 64, whereby each kind of processing of FIGS. 2, 4, 6, and the like is realized. Alternatively, at least one of the respective kinds of processing may be realized by hardware, such as a logic circuit.

The technical elements described in this specification or the drawings exhibit technical utility singly or in various combinations and are not limited to the combinations described in the appended claims as filed. The techniques illustrated in this specification or the drawings simultaneously attain a plurality of purposes, and attaining one of the purposes per se offers technical utility.

What is claimed is:

1. An image processing apparatus comprising:
a processor; and
memory storing non-transitory computer readable instructions that, when executed by the processor, cause the image processing apparatus to execute:
acquiring target data representing a target image, the target data being acquired from an image inputting device;
calculating, for each of a plurality of target pixels forming the target data, a density relation value related to density of the target pixel;
selecting a conversion color for an object pixel among the plurality of target pixels;
converting a pixel value of the object pixel to generate converted data such that, the higher the density represented by the density relation value of the object pixel, the closer the pixel value of a pixel of the converted data to a value indicative of the conversion color for the object pixel; and
communicating the converted data to an image outputting device
wherein the converting includes converting the pixel value of the object pixel such that, the lower the density represented by the density relation value of the object pixel, the closer the pixel value of the pixel of the converted data to a specific value, wherein the specific value is a value indicative of the color of a background image included in the target image, and wherein the computer readable instructions, when executed by the processor, cause the image processing apparatus to execute: analyzing the target data to calculate the value indicative of the color of the background image and deciding the specific value coinciding with the calculated value.

2. The image processing apparatus according to claim 1, wherein the converting includes converting the pixel value of the object pixel such that the pixel value of the converted pixel changes linearly according to the density indicated by the density relation value of the object pixel.

3. The image processing apparatus according to claim 1, wherein the computer readable instructions, when executed by the processor, cause the image processing apparatus to execute: extracting a first density relation value indicative of highest density and a second density relation value indicative of lowest density among a plurality of density relation values of the plurality of target pixels, the converting includes converting the pixel value of the object pixel based on a difference between the first density relation value and the second density relation value, and the density relation value of the object pixel.

4. The image processing apparatus according to claim 3, wherein when the density relation value of the object pixel coincides with the first density relation value, the pixel value of the object pixel is converted such that the pixel value of the converted pixel coincides with the value indicative of the conversion color for the object pixel, when the density relation value of the object pixel coincides with the second density relation value, the pixel value of the object pixel is converted such that the pixel value of the converted pixel coincides with a specific value, and the specific value is a value indicative of the color of a background image included in the target image.

5. The image processing apparatus according to claim 1, wherein the converting does not convert the pixel value of a specific pixel different from the object pixel among the plurality of target pixels, the object pixel is a pixel which has a color within a predetermined achromatic color range, and the specific pixel is a pixel which has a color within a predetermined chromatic color range.

6. The image processing apparatus according to claim 1, wherein the computer readable instructions, when executed by the processor, cause the image processing apparatus to execute: acquiring specific data representing a specific image including a plurality of colors, the selecting includes extracting a corresponding pixel at a position in the specific data corresponding to the position of the object pixel in the target data and selects a color represented by the pixel value of the corresponding pixel as the conversion color for the object pixel.

7. The image processing apparatus according to claim 1, wherein the computer readable instructions, when executed by the processor, cause the image processing apparatus to execute:

determining for each of the plurality of target pixels whether or not the target pixel is the object pixel in which the density relation value is equal to or higher than predetermined density; and sorting two or more object pixels into N (where N is an integer equal to or greater than 2) pixel groups, wherein for each of the N pixel groups, the selecting includes selecting the same color as the conversion colors for all object pixels belonging to the pixel group.

8. The image processing apparatus according to claim 1, wherein the acquiring includes reducing original data having a first medium size and acquiring the target data having a second medium size smaller than the first medium size, and the computer readable instructions, when executed by the processor, cause the image processing apparatus to execute: when a first instruction is given, writing the converted data into template data having the first medium size and generating output data, when the first instruction is given, the outputting includes outputting the output data to cause a printing execution unit to execute printing on a printing medium having the first medium size, and when a second instruction different from the first instruction is given, the outputting includes outputting the converted data to the printing execution unit to cause the printing execution unit to execute printing on a printing medium having the second medium size.

9. The image processing apparatus according to claim 1, wherein the acquiring includes instruction from a printer, and the outputting includes outputting the converted data to the printer.

10. A non-transitory computer readable recording medium storing a program for an image processing apparatus which causes a computer mounted in the image processing apparatus to execute:

acquiring target data representing a target image, the target data being acquired from an image inputting device;

calculating, for each of a plurality of target pixels forming the target data, a density relation value related to density of the target pixel;

selecting a conversion color for an object pixel among the plurality of target pixels;

converting pixel value of the object pixel to generate converted data such that, the higher the density represented by the density relation value of the object pixel, the closer the pixel value of a pixel of the converted data to a value indicative of the conversion color for the object pixel; and communicating the converted data to an image outputting device, wherein the converting includes converting the pixel value of the object pixel such that, the lower the density represented by the density relation value of the object pixel, the closer the pixel value of the pixel of the converted data to a specific value, wherein the specific value is a value indicative of the color of a background image included in the target image, and wherein the program, when executed by the image processing apparatus, causes the computer mounted in the image processing apparatus to execute: analyzing the target data to calculate the value indicative of the color of the background image and deciding the specific value coinciding with the calculated value.

* * * * *